United States Patent [19]

Wakahara et al.

[11] Patent Number: 4,754,400
[45] Date of Patent: Jun. 28, 1988

[54] PROTOCOL VALIDATION SYSTEM

[75] Inventors: Yasushi Wakahara, Kanagawa; Yoshiaki Kakuda, Tokyo; Masamitsu Norigoe, Saitama; Toshikane Oda, Tokyo, all of Japan

[73] Assignee: Kokusai Denshin Denwa Co., Ltd., Tokyo, Japan

[21] Appl. No.: 106,030

[22] Filed: Oct. 8, 1987

Related U.S. Application Data

[63] Continuation of Ser. No. 711,934, Mar. 15, 1985, abandoned.

[30] Foreign Application Priority Data

Sep. 17, 1984 [JP] Japan .................................. 59-192491

[51] Int. Cl.⁴ .......................... G06F 9/44; G06F 11/08
[52] U.S. Cl. ........................................ 364/300; 364/200
[58] Field of Search ... 364/200 MS File, 900 MS File, 364/300

[56] References Cited

U.S. PATENT DOCUMENTS

| | | | |
|---|---|---|---|
| 4,396,983 | 8/1983 | Segarra et al. | 364/200 |
| 4,442,484 | 4/1984 | Childs, Jr. et al. | 364/200 |
| 4,539,652 | 9/1985 | Rubin | 364/900 |
| 4,631,666 | 12/1986 | Harris et al. | 364/200 |

Primary Examiner—Gareth D. Shaw
Assistant Examiner—Kevin A. Kriess
Attorney, Agent, or Firm—Armstrong, Nikaido, Marmelstein & Kubovcik

[57] ABSTRACT

A communication protocol validation system which produces a global state transition chart having a plurality of states and a plurality of transitions between states in electrical form to find an error and/or a deadlock of the protocol has been improved by coupling a plurality of global transitions according to a predetermined algorithm and deleting redundant global transitions. Thus, a number of global states and a number of global transitions in the chart are reduced, and the validation is implemented by using a reasonable amount of hardware in a reasonable time.

2 Claims, 22 Drawing Sheets

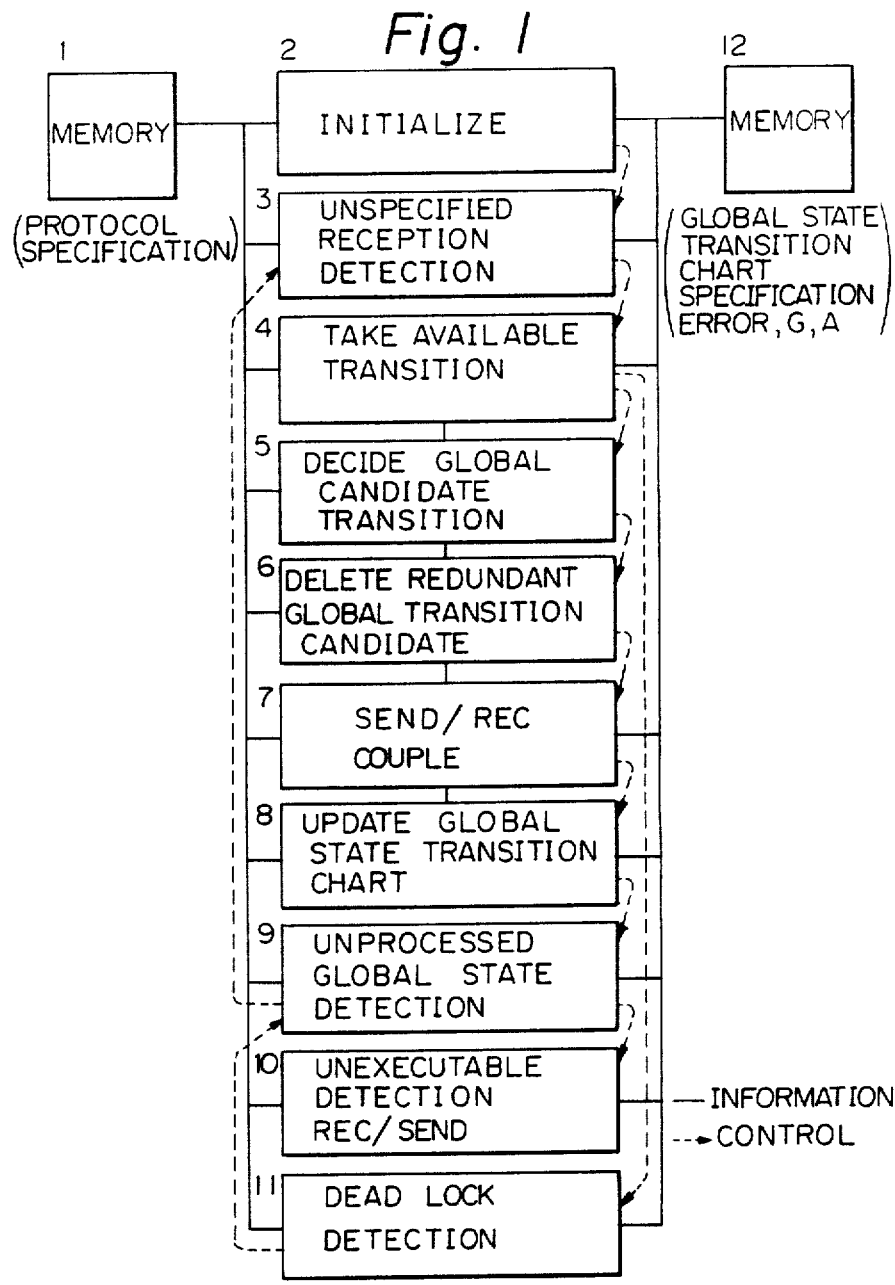

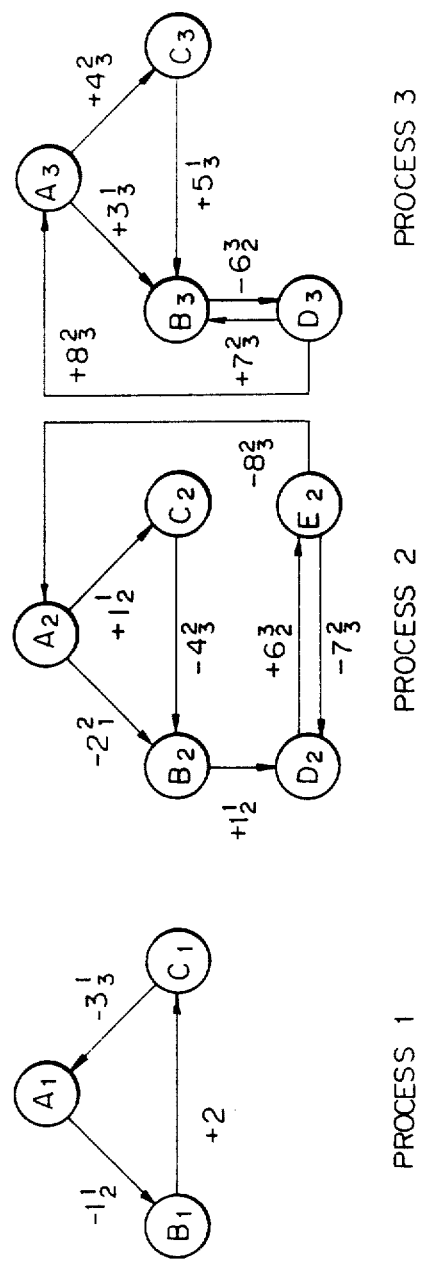
*Fig. 2* EXAMPLE OF PROTOCOL (INITIAL STATE = $A_1, A_2, A_3$)

Fig. 4(a)
PROCESS STATE TRANSITION

| PROCESS NAME | STATE NAME | TRANSITION (LABEL, STATE AFTER TRANSITION, REC/SEND PROCESS NAME) |
|---|---|---|
| 1 | $A_1$ | (−1) $B_1$ [1,2] |
| 1 | $B_1$ | (+2) $C_1$ [2,1] |
| 1 | $C_1$ | (−3) $A_1$ [1,3] |
| 2 | $A_2$ | (−2) $B_2$ [2,1], (+1) $C_2$ [1,2] |
| 2 | $B_2$ | (+1) $D_2$ [1,2] |
| 2 | $C_2$ | (−4) $B_2$ [2,3] |
| 2 | $D_2$ | (+6) $E_2$ [3,2] |
| 2 | $E_2$ | (−8) $A_2$ [2,3], (−7) $D_2$ [2,3] |
| 3 | $A_3$ | (+3) $B_3$ [1,3], (+4) $C_3$ [2,3] |
| 3 | $B_3$ | (−6) $D_3$ [3,2] |
| 3 | $C_3$ | (+5) $B_3$ [1,3] |
| 3 | $D_3$ | (+8) $A_3$ [2,3], (+7) $B_3$ [2,3] |

Fig. 4(b)
FORMAT IN MEMORY 1

| PROCESS NAME | INITIAL STATE |
|---|---|
| 1 | $A_1$ |
| 2 | $A_2$ |
| 3 | $A_3$ |

Fig. 5(a)

EXAMPLE OF GLOBAL STATE TRANSITION

| GLOBAL STATE NAME | GLOBAL TRANSITION (LABEL, GLOBAL STATE NAME AFTER TRANSITION) |
|---|---|
| $A_1 A_2 A_3$ | $\{-1-2\} B_1 B_2 A_3, \{-1\} B_1 A_2 A_3$ |
| $B_1 B_2 A_3$ | $\{+1+2\} C_1 D_2 A_3, \{+2\} C_1 B_2 A_3$ |
| $B_1 A_2 A_3$ | $\{+1\} B_1 C_2 A_3$ |
| $C_1 D_2 A_3$ | $\{-3\} A_1 D_2 A_3$ |
| $C_1 B_2 A_3$ | $\{\pm 3\} A_1 B_2 B_3$ |
| $B_1 C_2 A_3$ | $\{-4\} B_1 B_2 A_3$ |
| $A_1 D_2 A_3$ | $\{+3\} A_1 D_2 B_3$ |
| $A_1 B_2 B_3$ | $\{-6\} A_1 B_2 D_3$ |
| $B_1 B_2 A_3$ | $\{+4\} B_1 B_2 C_3$ |
| $A_1 D_2 B_3$ | $\{\pm 6\} A_1 E_2 D_3$ |
| $A_1 B_2 D_3$ | |
| $B_1 B_2 C_3$ | |
| $A_1 E_2 D_3$ | $\{\pm 8\} A_1 A_2 A_3, \{\pm 7\} A_1 D_2 B_3$ |

Fig. 5(b) OUTPUT OF UNSPECIFIED REC TRANSITION

| PROCESS NAME | GLOBAL STATE ||||||| UNSPECIFIED REC LABEL |
|---|---|---|---|---|---|---|---|
| | EACH PROCESS STATE ||| EACH STATE OF REC BUFFER ||| |
| | PROCESS 1 | PROCESS 2 | PROCESS 3 | 1→2 | 2→3 | 3→1 | |
| 1 | $A_1$ | $A_2$ | $A_3$ | 0 | 0 | 0 | +1 |
| 2 | $A_1$ | $B_2$ | $B_3$ | 1 | 0 | 0 | |

Fig. 5(c) DEAD LOCK OUTPUT

| GLOBAL STATE ||||||
|---|---|---|---|---|---|
| EACH PROCESS STATE ||| EACH STATE OF REC/SEND BUFFER |||
| PROCESS 1 | PROCESS 2 | PROCESS 3 | 1→2 | 2→3 | 3→1 |
| $B_1$ | $B_2$ | $C_3$ | 0 | 0 | 0 |

Fig. 5(d) OUTPUT OF UNEXECUTABLE TRANSITION

| PROCESS NAME | STATE NAME | TRANSITION LABEL |
|---|---|---|
| 3 | $C_3$ | +5 |

Fig. 6 APPLICATION RESULT OF PRESENT INVENTION
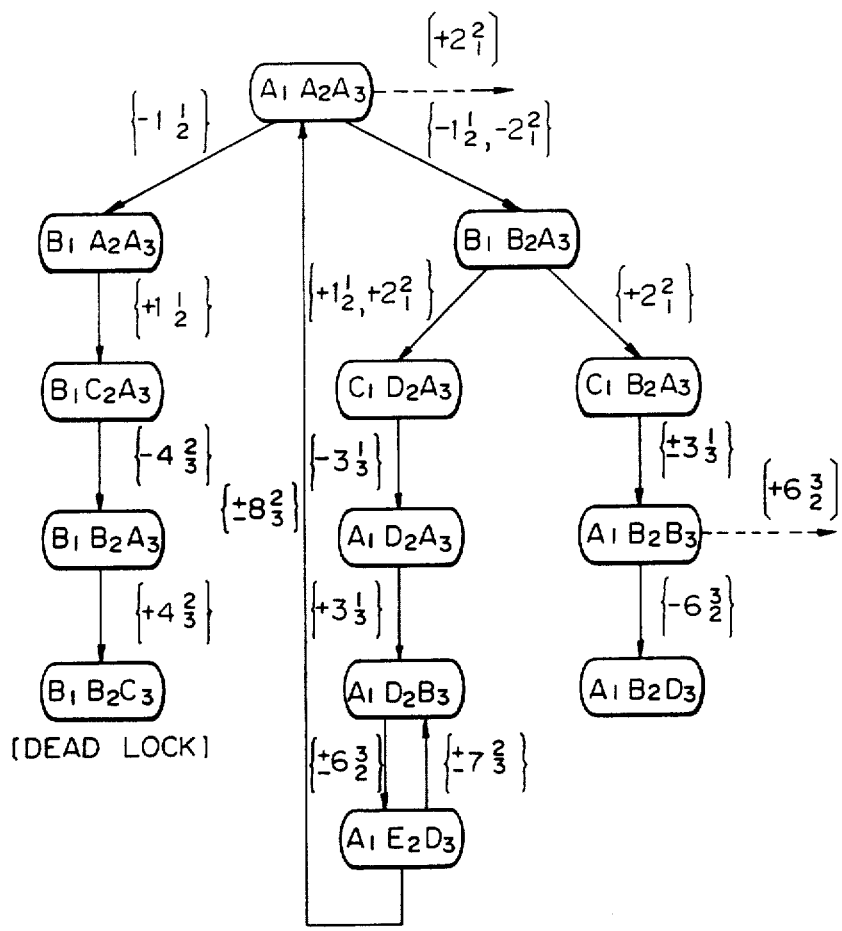
UNEXECUTABLE TRANSITION = $[+5\frac{1}{3}]$
EXECUTABLE UNSPECIFIED RECEPTION = $[+2\frac{2}{1}, +6\frac{3}{2}]$
DEAD LOCK STATE = $[B_1 B_2 C_3]$

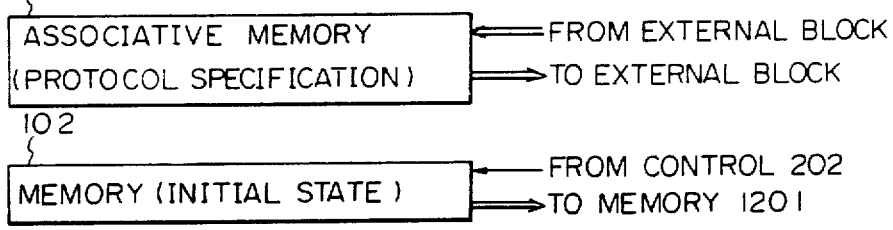
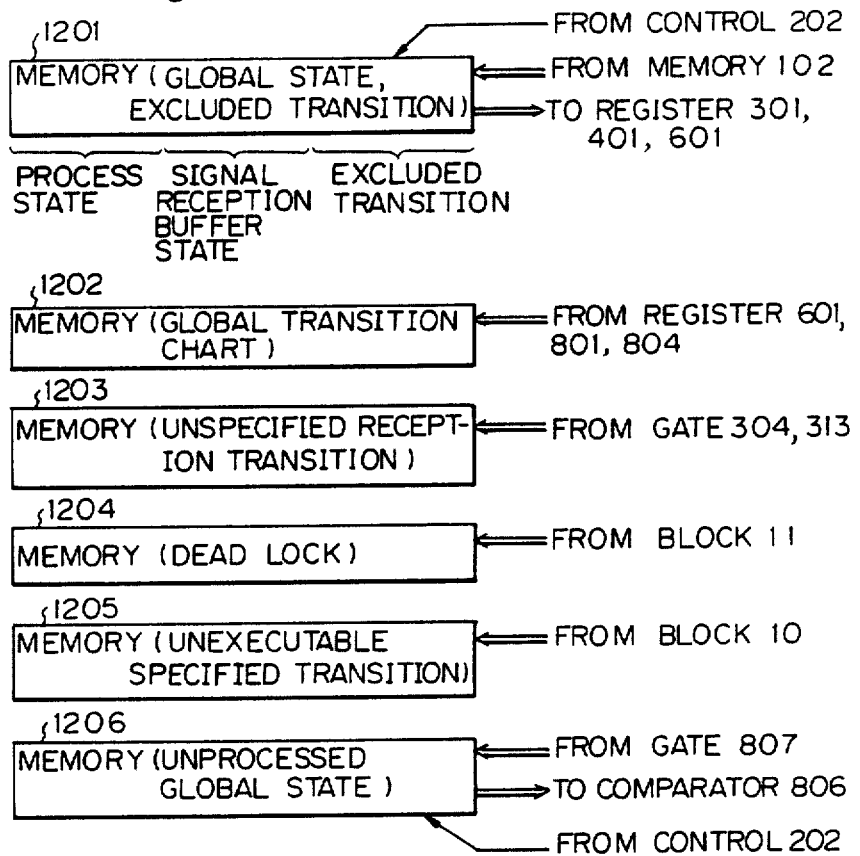

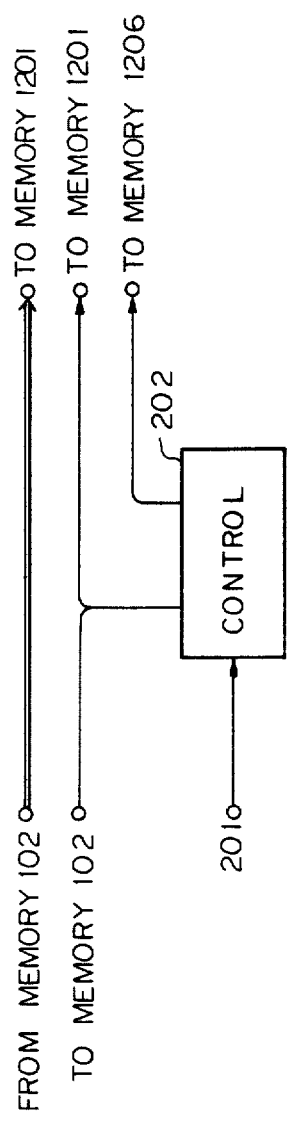

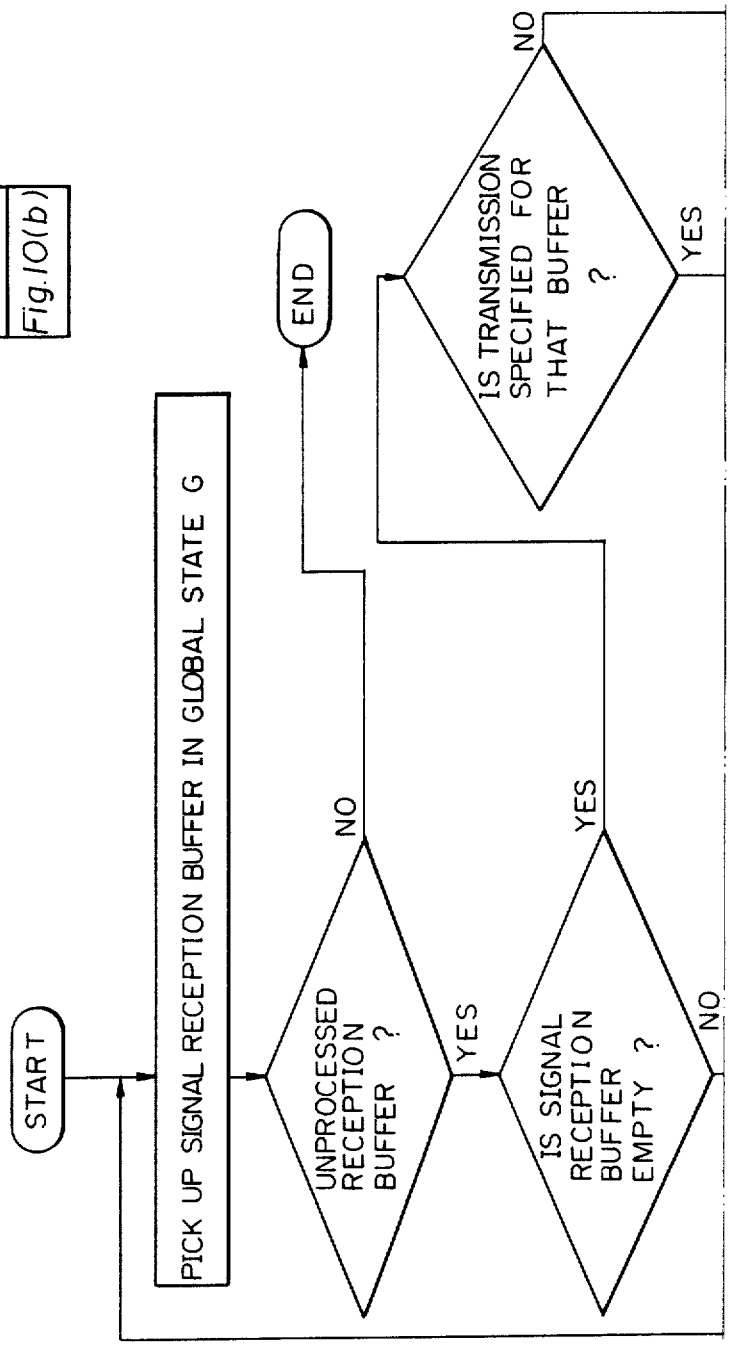

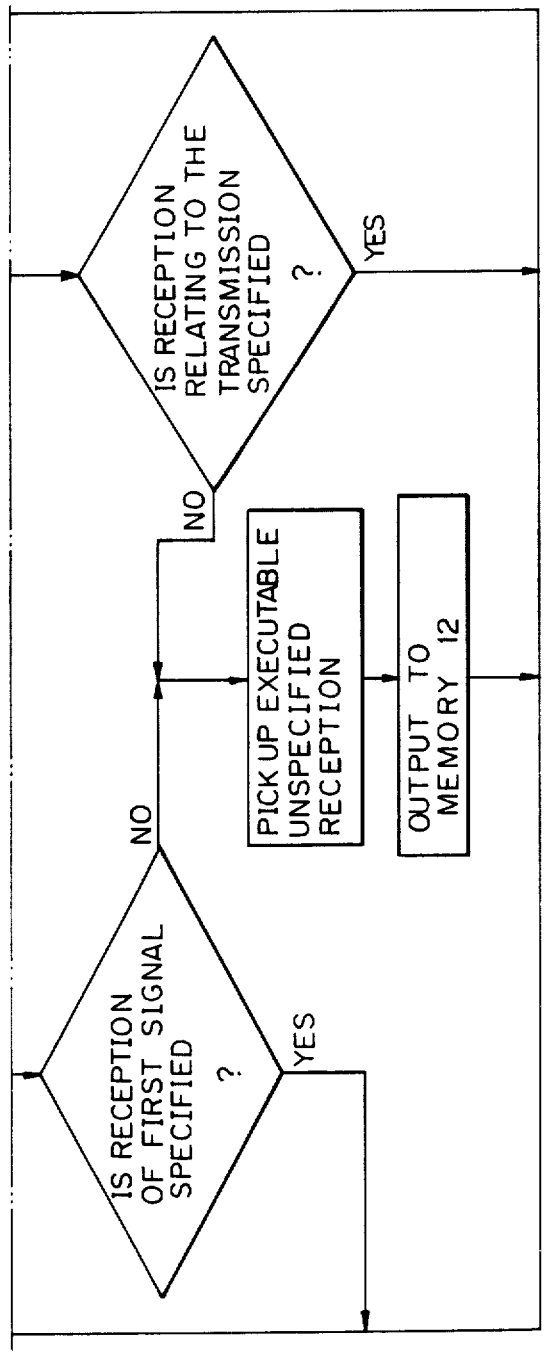

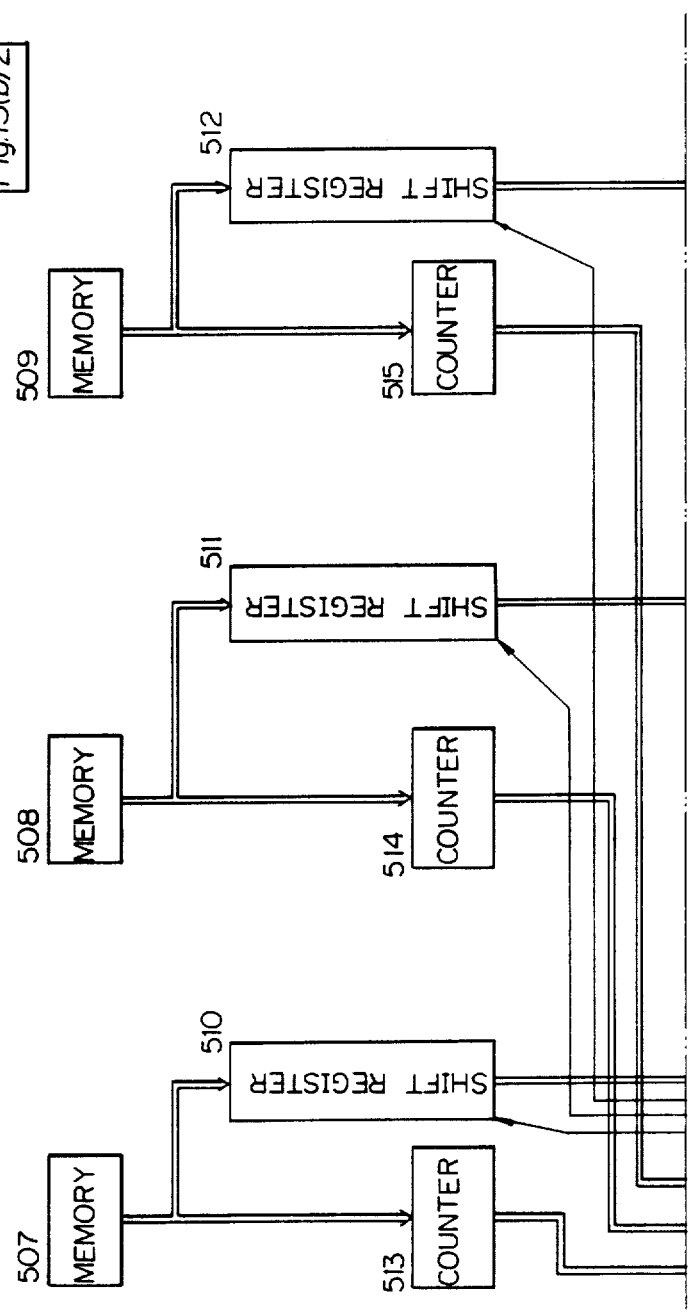

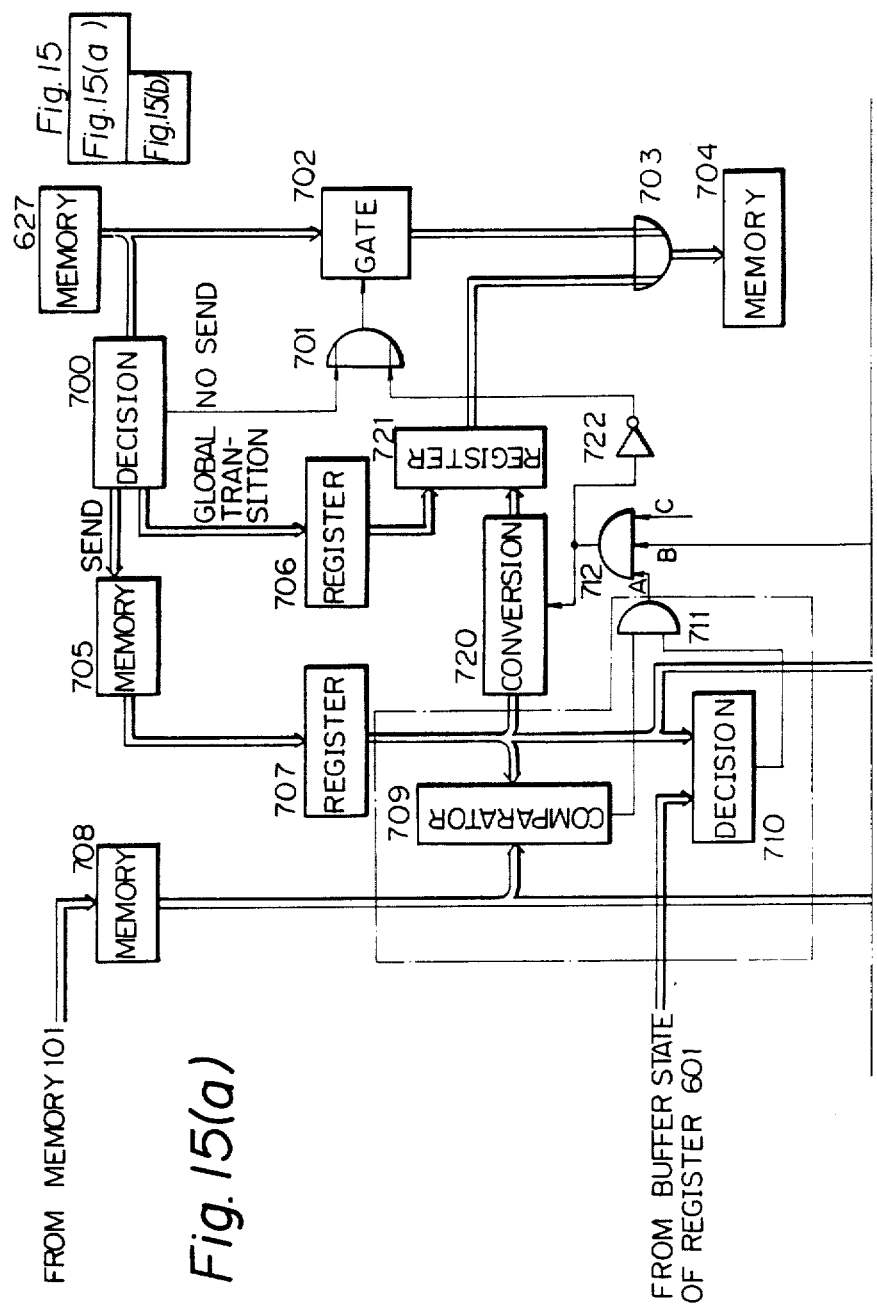

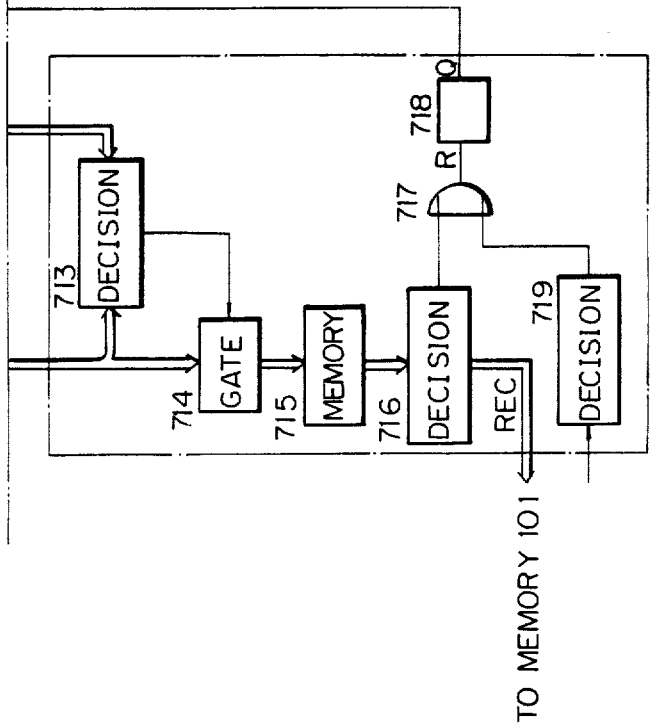
Fig.15(b) DECISION PART

PROTOCOL VALIDATION SYSTEM

This application is a continuation of application Ser. No. 711,934 filed Mar. 15, 1985 now abandoned.

BACKGROUND OF THE INVENTION

The present invention relates to a protocol validation system which receives a communication protocol specification, and detects an error in said specification.

A software system used in an electronic exchange system and/or a communication processing system has become complicated, following the latest development of communication technology. Therefore, the high productivity of producing a communication software is substantial.

One of the important means for enhancing productivity of a communication software is to define clearly the requested specification of a communication software, at early stage of study, so that no request fed back to a software designer happens.

A protocal which defines signal formats and/or procedure for transmission and/or reception of a signal through a communication line is one of the important softwares in communication. Therefore, when there is an error in a protocol, it is preferable that an automatic detection of that error is established.

Conventionally, a protocol validation has been accomplished by enumerating and testing all the combinations of the operation and the state of a communication system defined by the protocol.

A prior system is described in accordance with FIGS. 2 and 3.

FIG. 2 shows a protocol to be tested, and has a communication system with a process 1, a process 2 and a process 3. A process 1 and a process 3 may be a terminal apparatus, or a process 2 may be an exchange system, or all the processes 1, 2 and 3 may be included in a single CPU. A process performs a signal transmission and/or a signal reception between other processes of different function, and a communication system comprises a plurality of processes. FIG. 2 is an example of a protocol which has three processes.

In FIG. 2, a circle shows a state, and an arrow shows a transition. A label attached to an arrow shows a transmission or a reception of a signal. In general, $-a_j^i$ shows a transmission of a signal (a) from the process (i) to the process (j), and $+a_j^i$ shows a reception of a signal (a) from the process (i) to the process (j). Therefore, it is understood that the process 1 has the initial state $A_1$, changes the state to $B_1$ when it sends a signal (1) to the process 2, changes the state to $C_1$ when it receives the signal (2) from the process 2, and returns to the initial state $A_1$ when it sends the signal (3) to the process 3. Although an operation of a process itself is simple, it is difficult to find a logical error in operation between each of the processes.

Conventionally, a state transition chart which includes all the operation of a communication system is prepared, and finds a logical error in preparation of said chart. FIG. 3 shows a result of a prior test for the protocol of FIG. 2. FIG. 3 is called a global transition chart, since it shows all the system transitions of the system. A state of each process is shown in a circle, and that state is called a global state.

First, an executable transition in the initial global status $(A_1, A_2, A_3)$ is $-1_2^1$ in the process 1, and $-2_1^2$ in the process 2. The process 3 is unexecutable, since all the transitions are reception, and the signal 3 and the signal 4 are not sent from any process. Therefore, the transition $-1_2^1$ is first tested, and the global state $(B_1, A_2, A_3)$ is obtained. The immediately executable transition on that state is then detected, and $+1_2^1$ and $-2_1^2$ are found. The $+1_2^1$ goes to the global state $(B_1, C_2, A_3)$, at which the immediately executable transition is only $-4_3^2$, and the global state $(B_1, B_2, A_3)$ is obtained. Next, the process 3 receives the signal 4, and the global state changes to $(B_1, B_2, C_3)$ However, no transition is executable at that state. That is to say, although the state $(B_1)$ of the process 1 can receive the signal (2), the signal (2) is not sent from the process 2 before that state, therefore, it is unexecutable. Further, at the state $(B_2)$ of the process 2, although the signal 1 may be received, the signal 1 from the process 1 has already been handled when the global state $(B_1, A_2, A_3)$ changes to $(B_1, C_2, A_3)$, and further, at the state $C_3$ of the process 3, although the signal 5 can be received, the signal 5 has not been sent from any process before the global state $(B_1, B_2, C_3)$. Therefore, the global state $(B_1, B_2, C_3)$ has no executable transition. That state is called a deadlock state. One of the objects of a protocol validity system is to find a deadlock state.

It is noted that FIG. 3 includes all the executable transitions, therefore, a transition which is not included in FIG. 3 but included in FIG. 2 is redundant. Therefore, it is found that the state $(C_3)$ in the process 3 has the redundant signal reception $+5_3^1$.

At the global state $(A_1, B_2, A_3)$ in FIG. 3, the immediate executable transition is only $-1_2^1$. However, the signal 2 is sent from the process 2 to the process 1. Accordingly, the reception transition $+2_1^2$ must be possible at the global state $(A_1, B_2, A_3)$. That transition is not defined in the protocol of FIG. 2, and is detected as the unspecified reception. Similarly, the unspecified reception $+6_2^3$ at the global transition $(A_1, B_2, D_3)$ is found.

As described above, a protocol is tested by executing all the executable transitions starting from the initial global state $(A_1, A_2, A_3)$.

However, a prior protocol validity system thus described has the disadvantage that a large amount of handling time makes impossible the validity test, when a protocol is large and complicated with many states and transitions, since it handles all the executable transitions. In particular, it is almost impossible to implement the system reasonably in a hardware device, since a large capacity of memory is required for storing the global state transition chart. Therefore, no hardware implementation has been found.

SUMMARY OF THE INVENTION

It is an object, therefore, of the present invention to overcome the disadvantages and limitations of a prior protocol validity system by providing a new and improved protocol validity system.

It is also an object of the present invention to provide a protocol validity system which has only to handle a smaller amount of information processing.

The basic idea of the present invention is to connect operations of a communication system so that the number of state and transitions is reduced, so long as a protocol error may be detected.

According to the present invention, (1) the first step is to take a candidate of a global transition which is executable immediately, (2) the second step is to delete a redundant global transition candidate, and (3) the third step is to determine a global transition by coupling execution of both transmission and reception. Thus, the number of transitions and global states which are subject to test is reduced.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is a block diagram of the embodiment of the present invention,

FIGS. 4(a) and 4(b) show an example of a format of the memory 1 in FIG. 1,

FIGS. 5(a) through 5(d) show a format when a global state transition chart and errors are stored in the memory 12 of FIG. 1, FIG. 6 is a global state transition chart obtained by the present invention, FIG. 7 is a configuration of the memory 1 in FIG. 1, FIG. 8 is a configuration of the memory 12 in FIG. 1, FIG. 9 shows the initial set block 2 in FIG. 1, FIG. 10 shows how FIG. 10(a) and 10(b) combine to show a flowchart showing the operation of the unspecified reception detection block 3 in FIG. 1, FIG. 15 shows how FIG. 15(a) and 15(b) combine to show a detailed block diagram of the transmission-reception coupling block 7 in FIG. 1.

DESCRIPTION OF THE PREFERRED EMBODIMENTS

Figure 13A:
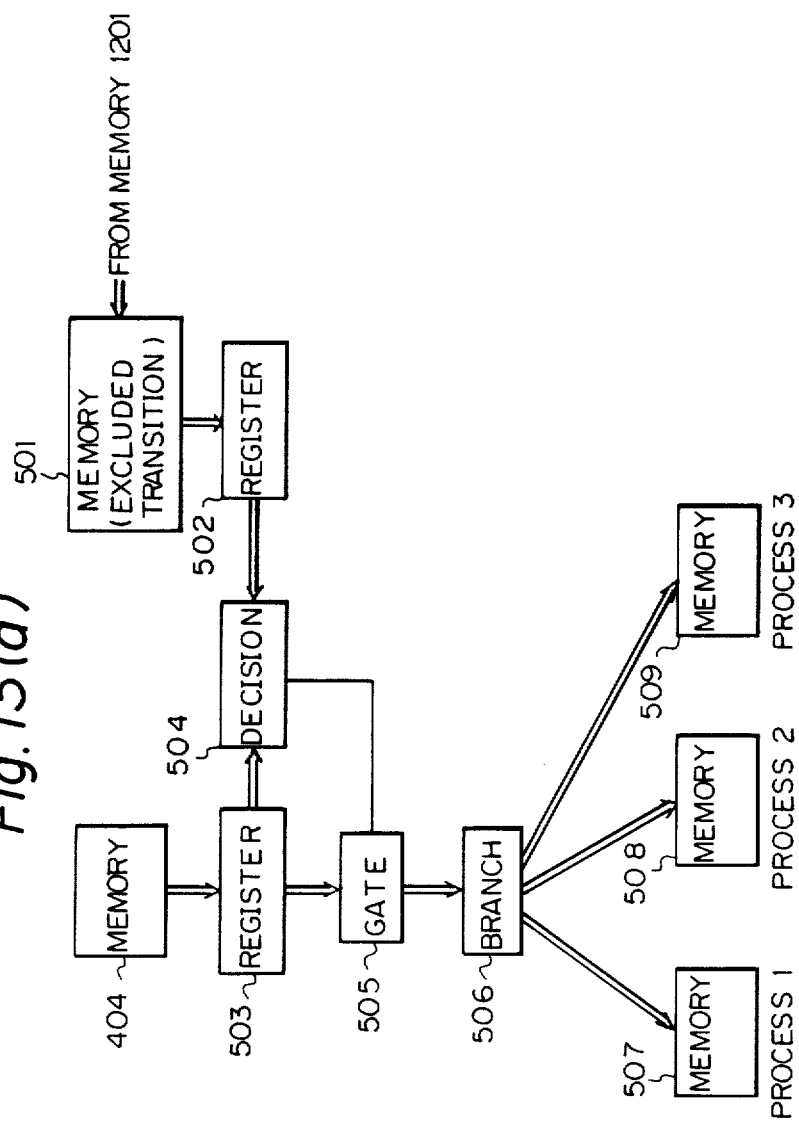
Figures 2, 13B:
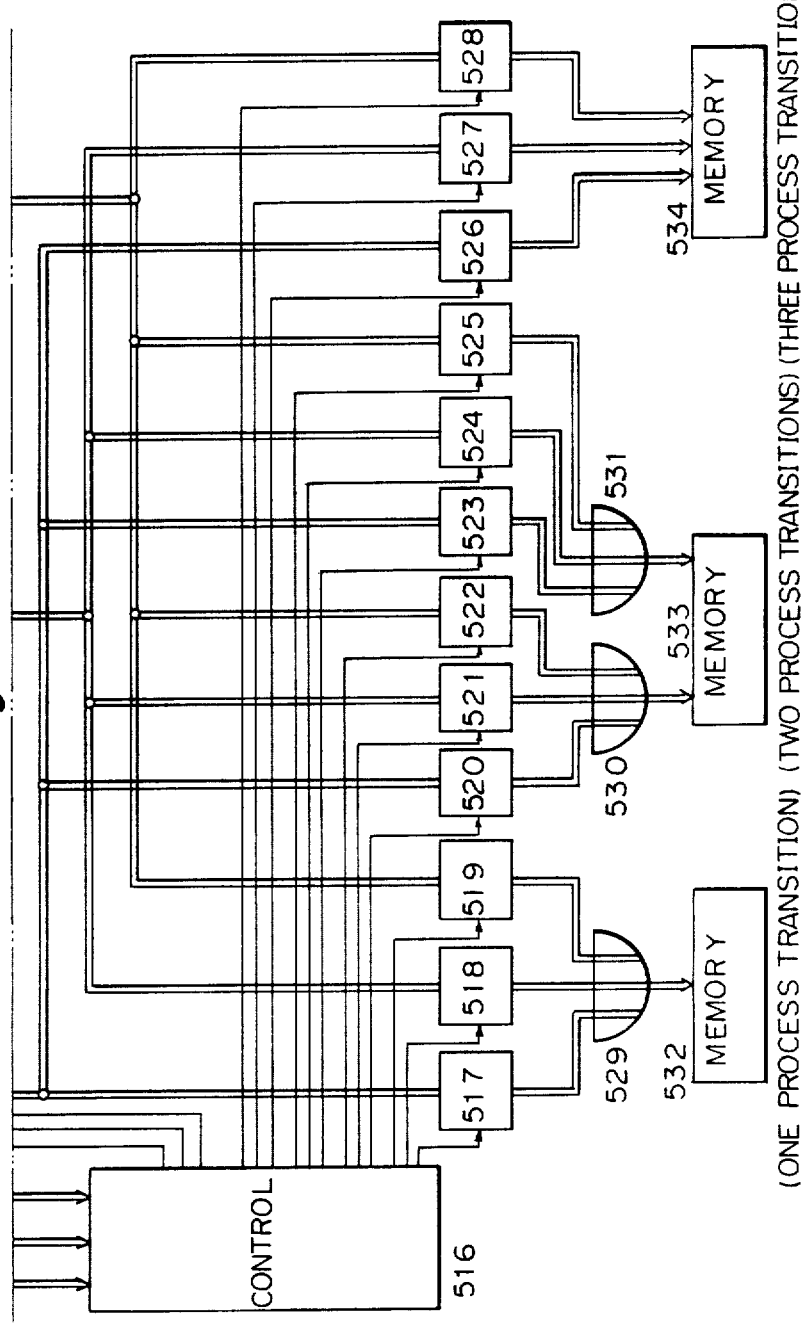
FIG. 2 is an example of a protocol which is subject to test.

It is assumed in the following description that a protocol shown in FIG. 2 is used as an example for the explanation of the present invention.

First, some terminology, and assumptions used in the present text are shown below.

It is assumed that a protocol is given by the combination of four terms, $Q_i$, $O_i$, $M_{ij}$, and succ $(i, j = 1, \ldots, N$; N is the number of processes).

$Q_i$; state set of process i $O_i$; initial state of process i $M_{ij}$; signal set of signals transmitted from process i to process j, where $M_{ii} = 0$ (empty set) $(i = 1, \ldots, N)$ succ; a function showing destination state by transmission or reception of signal in each state by a process. The succ(s,x) is the destination state of the process at the state s by the signal x $(x < 0$; transmission, $x > 0$; reception).

The following assumptions are taken for a protocol to be tested.

(1) The destination state by signal transmission and/or reception is solely defined by the signal itself and the original state.

(2) When a state returns to an initial state, no further transition occurs.

(3) Each process has a signal reception buffer with enough capacity for each related process.

(4) The reception signal sequence of the signal between processes is the same as the transmission signal sequence.

Among the above assumptions, the second assumption is provided merely for simple and easy explanation, and may be omitted in practical use.

Next, some terminology used in the present text is described.

The whole states G of the communication system is defined by the combination of S and C (G=S,C), and G is called a global state, where $S=(s_1, s_2, \ldots, s_n)$, $C=(c_{11}, c_{12}, \ldots, c_{nn})$, $s_i$ is a state of process i, $c_{ij}$ is a signal series in a reception buffer, which is sent from the process i to the process j, but is not handled on the reception side. When the reception buffer is completely empty, the empty global state $G=(S(\epsilon)_{ij=1}{}^N)$ is called a stable global state. In particular, a stable global state $G=((O_i)_{i=1}{}^N (\epsilon)_{ij=1}{}^N)$ is called an initial global state, and is expressed by $G_0$. When it is not confused, a global state is shown by only states of each process.

When a global state G changes to another global state G' by a signal transmission or a signal reception, the relations between G and G' is shown by G ⊢ G'. When the G which is reached by repeating the transitions from the initial global state $G_0$ (G ⊢ ,,, ⊢ G), that G is defined accessible or reachable.

When $x < 0$, the sequence pair (s,x) is called a signal transmission transition, and when $x > 0$ that is called a signal reception transition. When succ(s,x) is defined in a given protocol, (s,x) is called a specified transition, or specified transmission (reception).

A specified transmission (s,x) $(x < 0)$ is executable, if a global state which includes s is accessible. A specified reception (s,x) $(x > 0)$ is executable, if a global state, which includes s and has x at the beginning of a reception buffer, is accessible.

A global transition is defined as a transition from a global state G to another global state G', and is expressed by [ ].

The present invention is available to find the protocol errors listed below.

(1) A redundant signal definition; unexecutable signal transmission/reception included in a protocol specification.

(2) Lack of signal definition; unspecified reception which is not included in a protocol specification, but is executable.

(3) A dead lock state; no transition is possible for all the processes, and all the signal reception buffer is empty in stable global state.

FIG. 1 is a block diagram of the embodiment of the present invention. In the figure, the numeral 1 is a memory which stores a protocol specification applied by an external circuit, 2 is an initial set block for initiating variables for validity process, 3 is an unspecifed reception detection block for detecting executable unspecified reception in a designated global state, 4 is an immediately executable transition pick-up block for taking an immediately executable transition in a designated global state, 5 is a global candidate transition decision block for taking a candidate of a global transition in a designated global state, 6 is a redundant global candidate deletion block for deleting a redundant global transition candidate according to result of said block 5, 7 is a transmission/reception block for determing a final global transition by coupling process of a transmission transition and a reception transition according to result of the block 6, 8 is a global state transition update block for updating global state transition chart by adding a new global state which is obtained in the block 7, but is not included in the old chart, 9 is an unprocessed global state detection block for detecting an unprocessed global state in the chart updated by the block 8, and when an unprocessed global state is detected, outputs the state to a memory 12, and when no global state is detected, informs the information to the block 10. The numeral 10 is an unexecutable transmission/reception detection block for providing an unexecutable specified transmission/reception by comparing signal transmission/reception in a protocol specification and a signal transmission/reception in a global state transition chart, 11 is a deadlock block which shows that a designated global state is in deadlock state, and 12 is a memory for storing result of validity test of a global state transition chart, and some variables.

FIG. 4 shows a format when a protocol specification is stored in a memory 1. FIG. 5 shows a format when a global state transition chart and errors are stored in the memory 12 in the form of a table.

FIG. 6 is a global state transition chart obtained by processing the protocol of FIG. 2 by the embodiment of FIG. 1. The operation of FIG. 1 is described in accordance with the examples of FIGS. 2 and 6.

First, the configuration of the memories 1 and 2 is described. FIG. 7 shows a detail of the memory 1, and the numeral 101 is an associative memory for storing a state transition for each state in a protocol specification in the format of FIG. 4(a), 102 is a memory for storing an initial state of each process in the protocol specification in the format of FIG. 4(b). An associative memory stores information in a plurality of groups, and when an input relating a cell information in one group is provided, a whole information relating to said cell information is output. The associative memory 101 stores each line of FIG. 4 in a group, and for instance when an input (process=1, and state=$B_1$) is applied, the output (label= +2, transmission/reception process=2/1, state after transition=$C_1$) is provided. When an input is (process=2, state=$A_2$), the output is (label= −2, transmission/reception process=2/1, updated state=$B_2$), and (label= +1, transmission/reception process=2/1, updated state=$c_2$).

Occassionally, an input/output of a partial information which differs from the above examples is requested, like an input is (process=2, state=$B_2$, label= +1, transmission/reception process=$\frac{1}{2}$), and output is (updated state=$D_2$). Therefore, an associative memory for each partial input information must be prepared. However, for the sake of the simplicity of an explanation of an idea of the present invention, it is assumed that a single associative memory 101 is prepared, and that single memory provides all the necessary information.

FIG. 8 shows a detail of the memory 12, in which the numeral 1201 is a memory for storing a global state which is subject to process in the next step and process transitions which are excluded when G and a global transition candidate in the global state are introduced. (That kind of process transition is called an excluded transition, which is described in accordance with the block 5, later). The numeral 1202 is a memory for storing global state transition chart information as shown in FIG. 5(a). The numerals 1203, 1204 and 1205 are memories for storing, unspecified reception transitions shown in FIG. 5(b), deadlocks of FIG. 5(c), and redundant specified transitions of FIG. 5(d), respectively. The numeral 1206 is a memory for storing a set ( $\wedge$ ) of global states which have not been processed, and excluded transitions for each global state in the set.

In FIG. 1, the initial set block 2 operates first. The initial set block 2 accesses the memory 1 and provides the same an initial state of each process in a protocol to provide an initial global state, and an initial global state for variable G for designating a global state which is subject to process in each block. Further, a variable ( $\wedge$ ) is defined in an empty set for expressing a set of unprocessed global state. Those information is provided to the memory 12 to trigger the unspecified reception detection block 3.

FIG. 9 shows a detail of the initial set block 2, in which the numeral 201 is an input terminal for receiving an electrical signal of a start signal of protocol validation test, and 202 is a control circuit for providing control signals to the memory 102, memory 1201, the memory 1206, and the unspecified reception detection block 3, upon application of an input signal to the terminal 201. When the control circuit 202 provides a control signal to the memory 102, the memory 102 provides the initial state information for each process. That information is stored in the process state store of the memory 1201 which stores a global state G which is processed in the next step. The buffer state store and the excluded transition part of the memory 1201 are initiated to zero upon application of the control signal from the control circuit 202. Also, the memory 1206, or the unprocessed global state is initiated to 0 (empty set) upon application of the control signal from the control circuit 202 to the memory 1206.

When the control circuit 202 sends a control signal to the unspecified reception detection block 3, the unspecified reception detection block 3 starts the operation.

FIG. 10 shows a flow chart showing the operation of the unspecified reception detection block 3, in which the block 3 accesses the memory 12 so that a variable G which is a global state to be processed is appliled to the memory 12. Then, using the protocol in the memory 1, an executable unspecified reception shown in G is detected according to the following manners.

(1) As for a signal reception buffer in a global state G which is not empty, a reception signal at the head of the same is checked if that signal is specified in the protocol. All the unspecified reception is classified to an executable unspecified reception, and that information is stored in the memory 12.

(2) The next process is carried out for each of signal reception buffer which is empty in a global state G. The symbol i is defined as a transmission/reception process of a signal which is stored in a signal reception buffer, and the symbol j is defined as the reception process. A test is carried out if a process i at a global state G has a transmission transition for a process j. When that transmission transition exists, a test is carried out if the process j has a reception transition in a global state G to receive that reception transition from said transmission transition. When no reception transition exists in the process j, it is defined as an executable unspecified reception, which is stored in the memory 12.

In the initial global state ($A_1$, $A_2$, $A_3$) in FIGS. 2 and 6, all the signal reception buffers are empty, and the transmission transitions $-1_2^1$ and $-2_1^2$ are defined in said global state. The reception transition corresponding to said $-2_1^2$ is not defined at that global state. Therefore, $+2_1^2$ is output as an executable unspecified reception.

Figure 3:
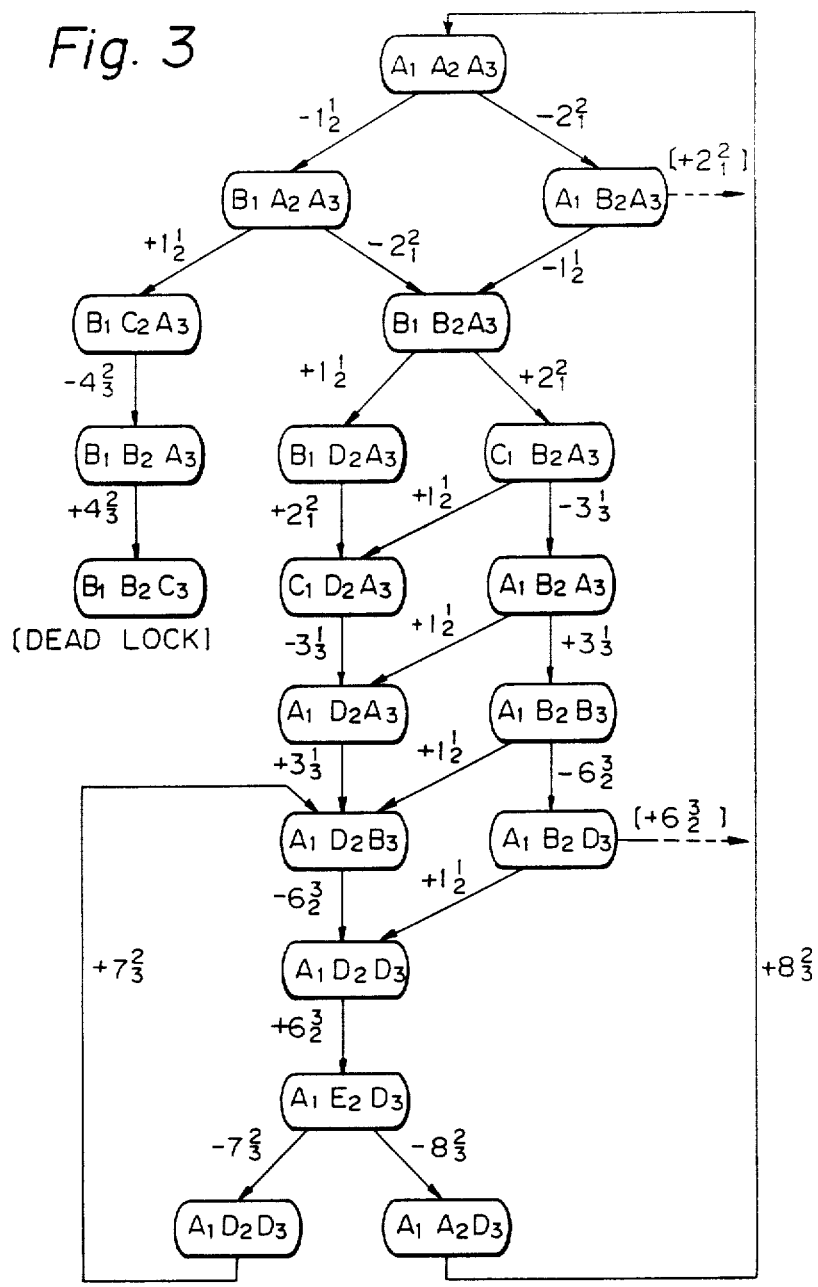
FIG. 3 is a prior global transition chart.
Figure 11:
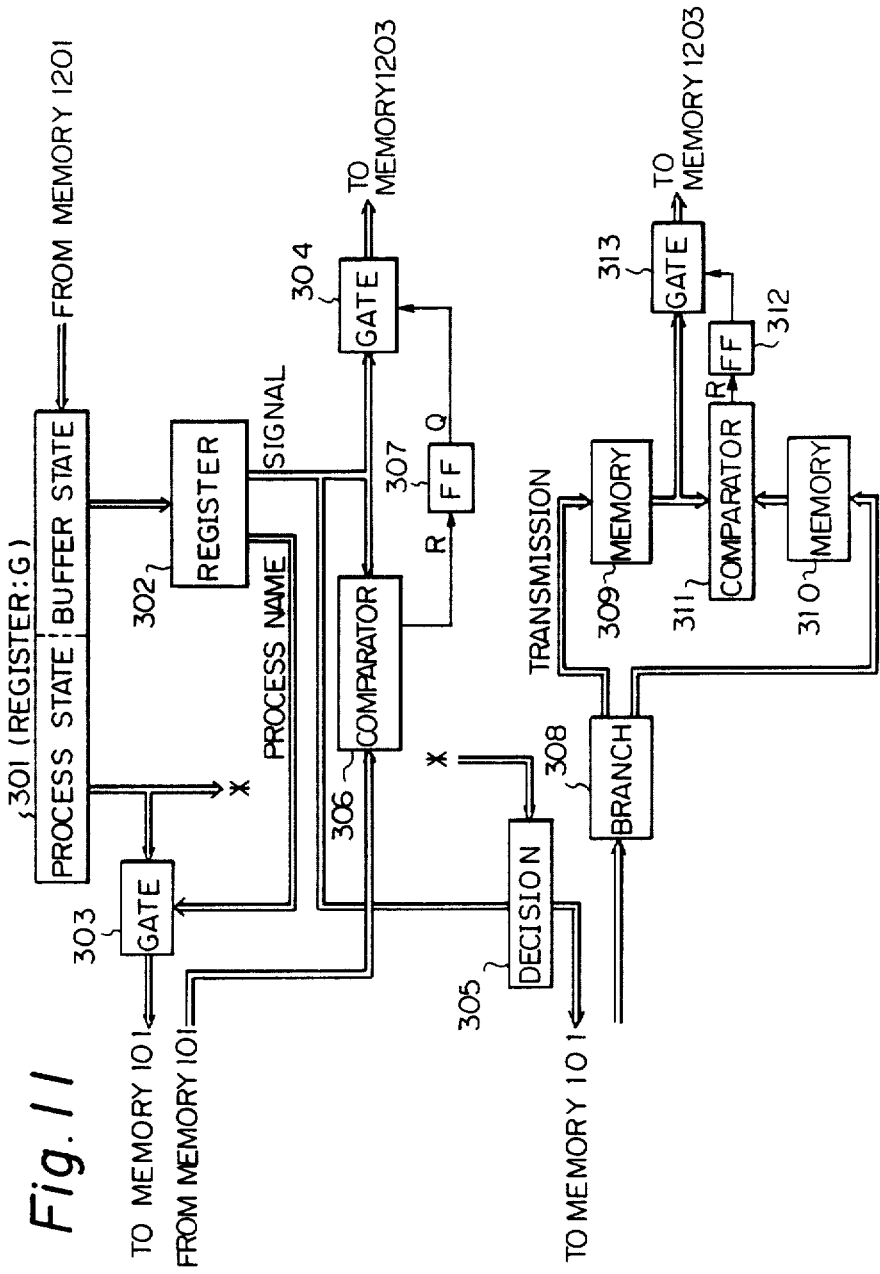
FIG. 11 is a detailed block diagram of the unspecified reception detection block 3 in FIG. 1.

FIG. 11 shows a detailed block diagram of the unspecified reception detection block 3, which operates upon reception of a control signal from the control circuit 202 in the initial set block 2, as follows.

The memory 1201 is first accessed, and the global state G which is processed in the next step, stored in the memory 1201 is applied to the register 301. The global state G in the register 301 is separated to a process state part and a buffer state part. In the latter, a head signal of each buffer and a process name for receiving said head signal are transferred to the register 302 in parallel form. A pair of process name and a signal stored in the register 302 are read out, and are applied to the gate 303, and the gate 304, the decision circuit 305 and the comparator 306, respectively. The gate 303 passes only the process state designated by the process name by the register 302 among the process state part of the global state G in the register 301. As a result, the memory 101 provides the specified transmission/reception thus designated and waiting in the state, and output of the memory 101 is applied to the comparator 306. Thus, the comparator 306 receives the head signal of the signal reception buffer at the global state G from the register 302, and the specified transmission/reception which waits at the global state G relating to the reception process in said buffer from the memory 101. When the signal reception stored in the head of the signal reception buffer is defined in the memory 101, the output of the comparator 306 turns ON upon the input to the reception memory 101, and the flip-flop 307 which is in set status is reset. On the other hand, when the signal reception stored in the head of the signal reception buffer is not defined in the memory 101, the flip-flop 307 remains set status. As a result, the gate 304 opens in the latter case, and the signal in the register 302 is stored in the memory 1203 as an executable unspecified reception.

When a signal reception buffer is empty, that fact is detected by the decision circuit 305, and the transmission process name corresponding to the buffer, the reception process name, and the process state information of the global state G are sent to the assosiative memory 101. As a result, the associative memory 101 provides the transmission/reception transition between the transmission process and the reception process defined by the global state G, and those are applied to the branch circuit 308. The branch circuit 308 separates the transmission and the reception, and each is stored in the memories 309 and 310, respectively. Next, the comparator 311 compares each transmission in the memory 309 with each reception in the memory 310. The comparison result controls the gate 313 through the flip-flop 312. As a result, a transmission which is stored in the memory 309 but has no related reception in the memory 310, passes the gate 313, and is stored in the memory 1203.

When the above operation finishes, the block 3 triggers the immediately executable transition detection block 4.

The immediately executable transition detection block 4 accesses the memories 1 and 12 to pick up the immediate executable transmission/reception transition at the global state G, according to the following operation, and provides the result to the global transition candidate decision block 5.

(1) All the transmissions defined in the global state G are executable. For instance, in the protocol in FIG. 1, in the initial global state ($A_1$, $A_2$, $A_3$), $-1_2^1$ and $-2_1^2$ are immediately executable transmission transitions.

(2) All the receptions which include a signal designated by the reception transition at the head position are immediately executable. For instance, in the protocol of FIG. 1, at the global state ($B_1$, $B_2$, $A_3$) which is obtained by executing the process transitions $-1_2^1$ and $-2_1^2$ at the initial global state, as the content of the signal reception buffers $c_{12}$, and $c_{21}$ are $C_{12}=[1]$, and $C_{21}=[2]$, the reception transitions $+1_2^1$ and $+2_1^2$ defined by the processes 1 and 2 are immediately executable.

Figure 12:
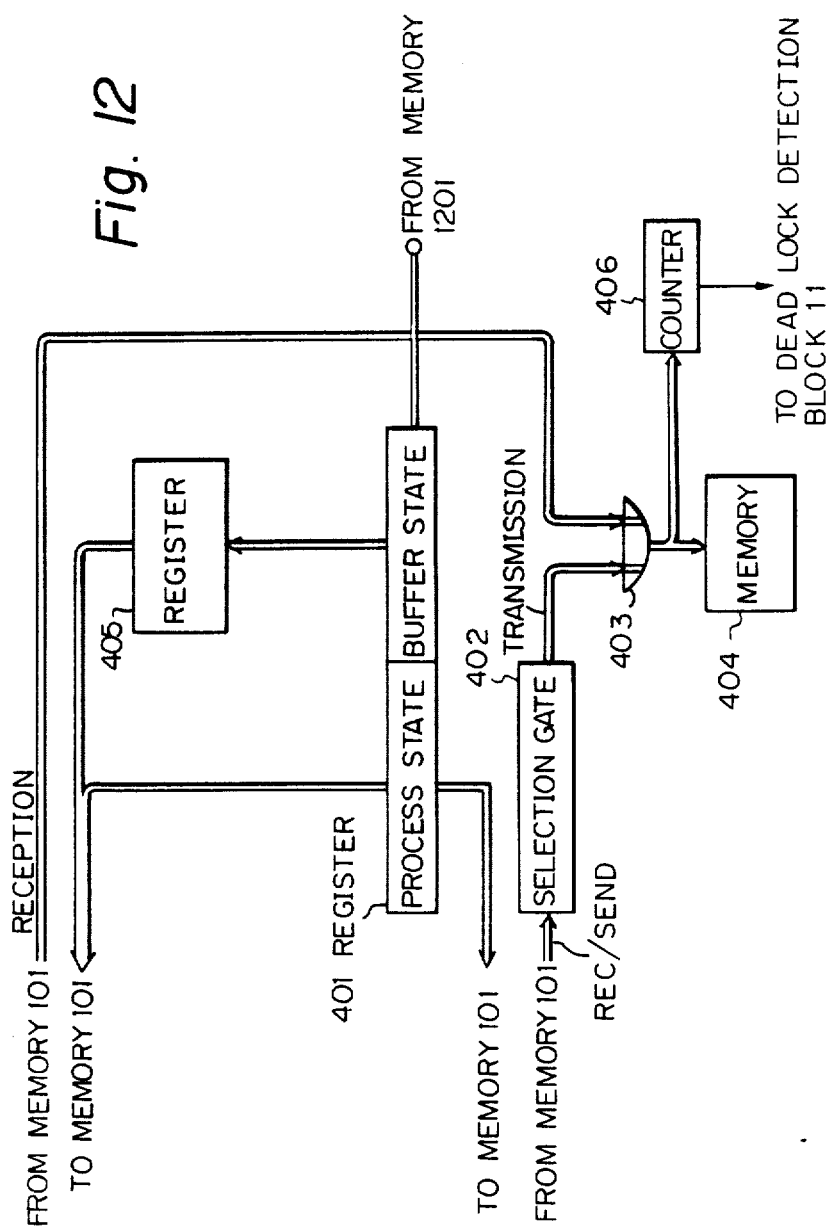
FIG. 12 is a detailed block diagram of the immediately executable transition pick up block 4 in FIG. 1, FIGS. 13(a) and 13(b), 13(b)-1 and 13(b)-2 are detailed block diagrams of the global transition candidate decision block 5 in FIG. 1.

FIG. 12 shows a detailed block diagram of the immediate executable transition pick up block 4, which operates as follows. In FIG. 12, the numeral 401 is a register which stores a global state G which is subject to process stored in the memory 1201. The process state part in the global state information in the register 401 is sent to the memory 101. As a result, the transmission/reception defined by that in the designated process state is read out. Among them, only the transmission passes the gate 401, and stored in the memory 403 through the OR gate 402. The numeral 405 is a register storing the head signal of each buffer in the buffer state part of the register 401. Each of the head signal in said buffer, and the process state information are sent to the memory 101. As a result, when the reception corresponding to the head signal in the buffer is defined in the global state G, it is read out of the memory 101, and is stored in the memory 404 through the gate 402.

The number of the immediately executable transitions in the memory 404 is counted by the counter 406. And, when that number is zero, that is to say, no immediately executable transition exists in the global state G, the dead lock detection block 11 is triggered.

The block 4, finishing the above operation, triggers the global transition candidate decision block 5, or the block 11.

The global transition candidate decision block 5 receives the result of the immediately executable transition pick up block 4, and determines the global transition candidates according to the following operation, and then, triggers the redundant global transition candidate deletion block 6.

In a global state, when there is only one executable process transition, the process transition becomes the global transition candidate from said global state. When there are a plurality of immediately executable process transitions, among the combination of the immediately executable process transitions, all the combination in which there is only one transition executed in each process becomes a global transition candidate from said global state.

Among the global transition candidates thus obtained, there may be one which does not include a transition of a process of immediately executable transition. In a global state after execution of that kind of global transition candidate, a global transition candidate is obtained by excluding the immediate executable transitions in the original global state. When a global transition candidate is determined, a process transition excluded in that determination is the excluded transition mentioned before.

For instance, in FIG. 2, the immediately executable transitions in the initial global state $(A_1, A_2, A_3)$ is $-1_2{}^1$ in the process 1, and $-2_1{}^2$ in the process 2. There are three global transition candidates $[-1_2{}^1]$, $[-2_1{}^2]$, and $[-1_2{}^1, 2_1{}^2]$ according to those combinations.

Among those three global transition candidates, $[-2_1{}^2]$ is deleted by the redundant global transition candidate deletion process mentioned later, and two candidates $[-1_2{}^1]$ and $[-1_2{}^1, -2_1{}^2]$ remain. The updated global states $(B_1, A_2, a_3)$ and $(B_1, B_2, A_3)$ are obtained by executing said two candidates.

The global transition $[-1_2{}^1]$ from the initial global state $(A_1, A_2, A_3)$ to the global state $(B_1, A_2, A_3)$ does not include a transition of the proces 2 which has the immediately executable transition $-2_1{}^2$ at the initial global state. Therefore, when a global transition from the global state $(B_1, A_2, A_3)$ is obtained, the transition $-2_1{}^2$ of the process 2 is excluded. As a result, the global transition from the global state $(B_1, A_2, A_3)$ is only $[+1_2{}^1]$ as shown in FIG. 6.

FIG. 13 is a detailed block diagram of the global transition candidate decision block 5, and the operation of the same is as follows.

In FIG. 13(a), the numeral 501 is a memory for storing the excluded transition of the global state G in the memory 1201. The numeral 502 is a register for storing temporarily an excluded transition in the memory 501, and 503 is a register for storing an immediately executable transition in the memory 404. The numeral 504 is a decision circuit in which an excluded transition stored in the memory 501 is read to the register 502 to compare with the register 503, for the immediately executable transitions in the register 503, and decides whether an immediately executable transition in the memory 503 is included in the excluded transition in the memory 501. The decision circuit 504 makes the signal to the gate 505 OFF when an immediately executable transition in the register 503 is an excluded transition, and makes the output to the gate 505 ON when an immediately executable transition in the register 503 is not an excluded transition. As a result, the immediately executable transition in the register 503 passes the gate 505 when it is not an excluded transition, and goes to the branch circuit 506.

The branch circuit 506 detects which process an input immediately executable transition belongs to, and when it belongs to the transition of the process 1, it transfers the same to the memory 507. Similarly, when it is the transition of the process 2, it transfers to the memory 508, and when it is the transition of the process 3, transfers to the memory 509. The operation is repeated for all the immediately executable transitions in the memory 403. As a result, the immediately executable transitions in the memory 403, except the excluded transitions in the memory 501, are transferred to the memories 507, 508 and 509 separately, according to the related process.

In FIG. 13(b), the immediately executable transitions of the processes 1, 2 and 3 stored in the memories 507, 508 and 509 are transferred to the circulation shift registers 510, 511, and 512, respectively, and the number of the transitions stored in each shift register is counted by the couters 513, 514, and 515. As mentioned before, the global transition candidates are produced by the combination of the immediately executable transitions stored in the shift registers 510, 511 and 512, and those are stored in the memories 532, 533, and 534, according to the number of process transitions, by the control circuit 516, the gates 517 through 528, and the OR gates 529 through 531.

When one process transition of global transition candidate is stored in the memory 532, the control circuit 516 opens the gate 517. Simultaneously, the shift register 510 shifts the content by the bits indicated by the counter 513, and all the process transitions in the same are transferred to the meomry 532. Then, all the process transitions in the shift registers 511 and 512 are stored in the memory 532 through the gates 518 and 519.

When a global transition candidate composed of two process transitions is stored in the memory 533, the control circuit 516 opens the gates 520 and 524. Simultaneously, the shift register 511 shifts the content by one circular amount. As a result, all the combination of the transition of the process at the head of the shift register 510 and the transition of the process in the shift register 511 is transferred to the memory 533. Then, the control circuit 516 shifts the shift register 510 by one process transition amount, and opens the gates 520 and 524, and shifts the shift register 510 by one circular amount again. That operation is repeated by the number of process transitions stored in the shift register 510. As a result, all the combination of the transition of the process 1 and the transition of the process 2 is stored in the memory 533 as a global transition candidate.

Similar operation is performed for the shift registers 511 and 512, and the shift registers 512 and 510, so that all the global transition candidates composed of two process transitions are stored in the memory 533.

The store operation to the memory 533 is described above. The similar operation, that is to say, the shift operation of the shift registers 510, 511, 512, alternately, makes it possible to store all the combination of the process transitions stored in three shift registers in the memory 534 as a global transition candidate.

When the above operation finishes, the block 5 triggers the block 6.

The redundant global transition candidate deletion block 6 deletes the combination of the global transitions which do not include the transitions of the processes that satisfy the following two conditions (a) and (b), among the candidates provided by the block 5, and the result is informed to the transmission/reception coupling block 7.

(a) A specified transition in the state in the process is either an immediately executable transition or unexecutable reception transition, and there is at least one immediately executable transition, where a reception defined by the global state G is recognized to be unexecutable, when (1) a transmission relating it is not specified, and (2) another signal exists in the reception buffer. The first condition (1) is in a strict sense that it is not immediately executable, and a transmission relating it is not defined after the global state G, that is to say, no signal exists when we return from G to the initial state along the specified transitions.

(b) The process at the state does not receive a signal from another process, or the first signal to be received can be specified, where a process is recognized that it can not receive a signal from another process when a transmission for the process is not defined at all. That definition is in a strict sense changed to that "when a transmission for the process is not defined after the global state G". Further, the condition that the process k can specify the first reception signal from the process i at the state $s_k$, in the global state $G = ((s_i)i = {}_1{}^N (c_{ij})i, j = {}_1{}^N)$ is either (1) all the specified transitions of the process i at the global state G are either transimssion to the process k, or unexecutable, or (2) the reception buffer from the process i to the process k is not empty.

In FIGS. 2 and 6, for example, there are three global transition candidates $[-1_2{}^1]$, $[-2_1{}^2]$, and $[-1_2{}^1, -2_1{}^2]$ from the initial global transition ($A_1$, $A_2$, $A_3$). As the process 1 satisfies the conditions (a) and (b) at the initial global state ($A_1$, $A_2$, $A_3$), the global transition candidate $[-2_1{}^2]$ which does not include the transition of the process 1 is deleted as the redundant one. In fact, the specified transition at the state $A_1$ at the process 1 is only $-1_2{}^1$ which is immediately executable. In the other hand, the signal from the process 2 to the process 1 is only 2, and the process 2 can transmit the signal 2 to the process 1 at the state $A_2$. Accordingly, the first reception signal of the process 1 at the state $A_1$ from the process 2 is specified to the signal 2. Further, the process 3 does not have a transmission signal to the process 1. Therefore, the process 1 does not receive a signal from the process 3, at the state $A_1$.

FIG. 14 is a detailed block diagram of the redundant global transition candidate deletion block 6, and in particular, shows the portion to delete a redundant global transition candidate which does not include a transition of a process 1. The redundant global transition candidate deletion circuit for the processes 2 and 3 is essentially the same as FIG. 14.

Figure 14A:
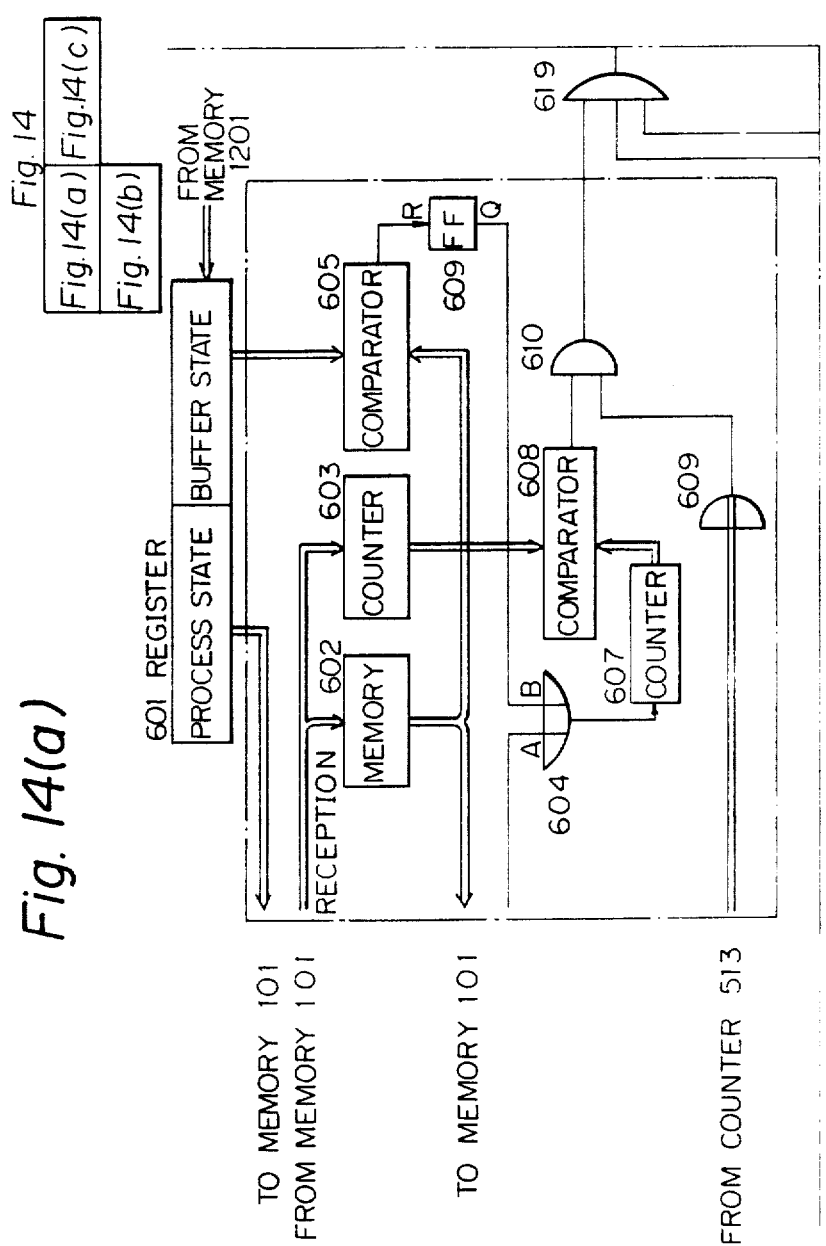
FIG. 14 shows how FIGS. 14(a) through 14(c) combine to show a detailed block diagrams of the redundant global transition candidate deletion block 6 in FIG. 1.

In FIG. 14, the numeral 601 is a register storing a global state G which is subject to process in the memory 1201. FIG. 14(a) is a decision circuit which tests if said condition (a) is satisfied or not. In FIG. 14(a), the state of the process 1 in the register 601 is sent to the associative memory 101, and the process 1 reads all the reception transitions waiting at that state, and stores the same in the memory 602. Simultaneously, the number of the reception transitions of that kind is stored in the counter 603. The reception stored in the memory 602 is transferred to the associative memory 101 to determine if a counter process has a transmission relating to the reception. As a result, when a counter process does not have such a transmission, the input A of the OR circuit 604 is turned ON. Simultaneously, each reception transition in the memory 602 is also sent to the comparator 605 to compare with the head signal in the signal buffer related to the register 601. When both coincide, or reception in the memory 602 is immediately executable, or the related signal reception buffer is empty, the output of the comparator 605 is turned ON. As a result, a flip-flop 609 which is in set state is turned to reset.

On the contrary, when the reception from the memory 602 differs from the head signal of the signal reception buffer, the flip-flop 609 remains set status, and the input B of the OR gate 604 is ON. With the above operation, the output of the OR gate 604 turns ON when each reception in the memory 602 satisfies the condition (1) or (2) mentioned in said paragraph (a).

The above operation is repeated for all the receptions in the memory 602.

The number of the receptions which satisfy said condition (1) or (2) is counted by the counter 607. The content of the counter 607 is compared with that of the counter 603 by the comparator 608, and when two contents coincide, that is to say, when all the receptions in the memory 602 satisfy the condition (1) or (2), the comparator 618 provides an ON output. The OR gate 609 receives the output of the counter 513, which is the number of the immediately executable transitions of the process 1 at the global state G indicated by the register 601. Therefore, the output of the OR gate 609 is ON when there is more than one immediately executable transitions of the process 1 at the global state G. Both of the outputs of the comparator 608 and the OR gate 609 are sent to the AND circuit 610, which is turned ON when said condition (a) is satisfied.

Figure 14B:
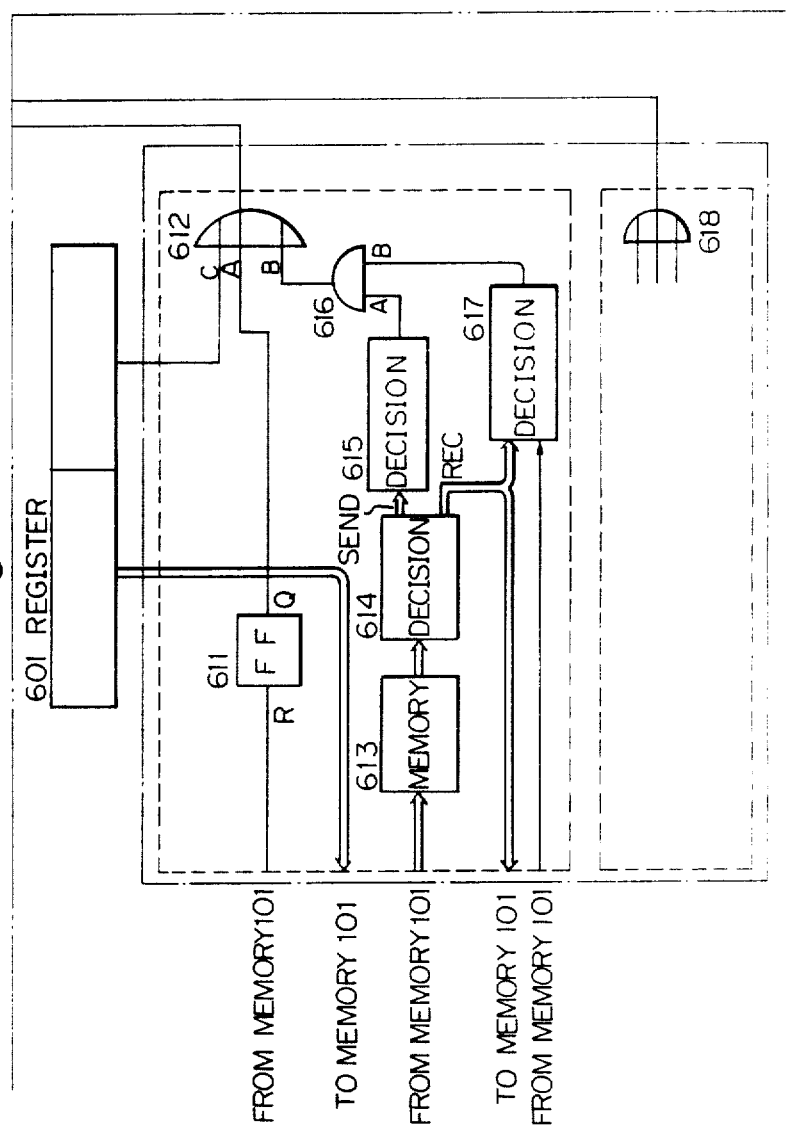

FIG. 14(b) tests if the condition (b) is satisfied or not, for the process 1. This circuit is composed of a portion to recognize if no reception signal from the process 2 exists, or reception is possible and first signal is specified, and a second portion to recognize no reception signal from the process 3 exists, or reception is possible and first signal is specified. As the former is essentially the same as the latter, only the former is described for the simple explanation.

In FIG. 14(b), the associative memory 101 is accessed to test if the process 2 has the transition by the transmission to the process 1. When the process 2 has the transition by the transmission to the process 1, the output of the associative memory 101 to the flip-flop 611 turns ON, then, the flip-flop 611 is reset, and the input A of the OR gate 612 turns OFF. On the contrary, when the process 2 does not have a transmission transition to the process 1, the input A of the OR gate 612 turns ON. Next, the state of the process 2 in the register 601 is sent to the associative memory 101, all the transitions that the process 2 has at the global state G in the register 601 are read out, and are stored in the memory 613.

Each transition stored in the memory 613 is applied to the decision circuit 614 which separates a transmission and a reception. The former is sent to the decision circuit 615, and the latter is sent to the associative memory 101 and the decision circuit 617. The decision circuit 615 tests if an input transmission is designated to the process 1 or not, and when there is more than one transmission to the process 1, the output of the decision circuit 615 is turned OFF. That is to say, the input A of the AND gate 616 is ON only when all the transmissions in the memory 613 are designated to the process 1. The reception in the memory 613 is sent to the associative memory 101. When no transmission related to the reception exists in the associative memory 101, that is to say, when the reception is unexecutable, the output of the associative memory to the decision circuit 617 turns ON, and when it is not unexecutable, that output turns OFF. The decision circuit 617 receives a control signal showing if each reception is unexecutable from the associative memory 101, and each reception of the memory 613 from the decision circuit 614, and when all the receptions are unexecutable, the output of the same turns ON. The input B of the AND gate 616 is ON at that time. Therefore, the output of the AND gate 616 is ON only when said condition (1) in the condition (b) is satisfied. The output of the AND gate 616 is the input B of the OR gate 612. Among the information in the channel state part of the register 601, the information showing if a signal in the signal reception buffer from the process 2 to the process 1 exists or not, becomes the input of the OR gate 612. That input C is ON when the signal reception buffer is not empty, that is to say, when the condition (2) of (b) is satisfied. As apparent from the above description, when the process 1 can not receive a signal from the process 2, the input A of the OR gate 612 is ON, and when all the specified transitions of the process 2 are transmissions to the process 1 or reception of unexecutable, the input B of the OR gate 612 is ON. Further, when the signal reception buffer from the process 2 to the process 1 is not empty, the input C of the OR gate 612 is ON. In other words, when the process 1 does not receive a signal from the process 2, or when said condition (b) in which the reception is possible and the first signal is specified, the output of the OR gate 612 is ON. Similarly, the output of the OR gate 618 is ON when said condition (b) is satisfied for the processes 3 and 1. The outputs of the AND circuit 610, the OR gates 612 and 618 are inputs of the AND gate 619. Therefore, the output of the AND gate 619 is ON when the global transition candidates produced in the block 5 do not include transition of the process 1 and redundant.

Figure 14C:
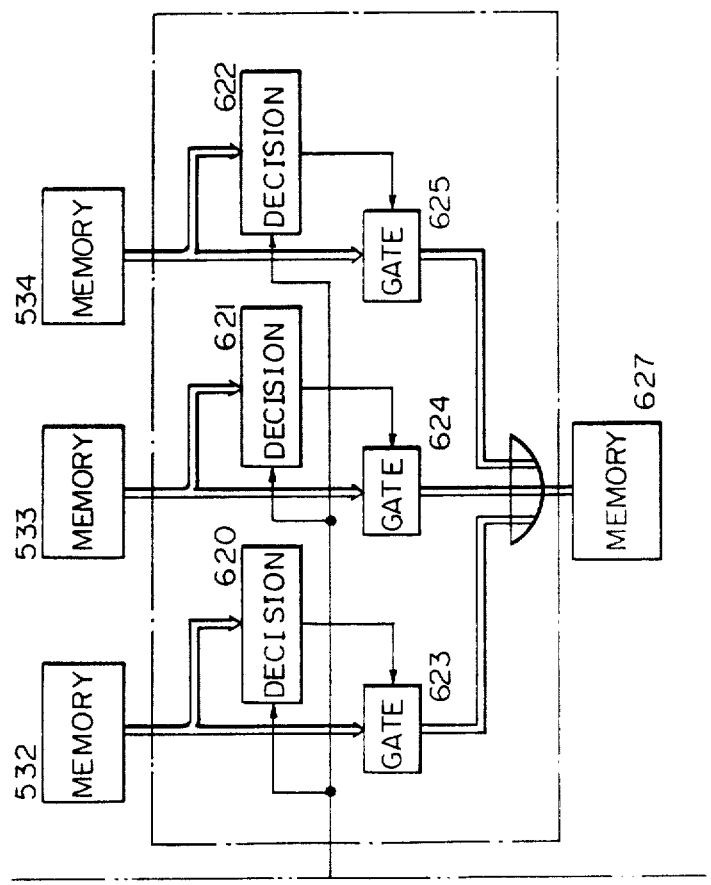

FIG. 14(c) is a circuit for deleting a candidate which does not include a transition to the process 1 when the output of the AND gate 619 is ON. In FIG. 14(c), the output of the AND gate 619 is applied to the decision circuits 620 through 622. Those decision circuits 620, 621, and 622 read out a global transition candidate stored in the memories 532, 533, and 534, one by one, and open the gate 623, 624 and 625 only when the inputs from the AND gate 619 is ON and the global transition candidate includes the process 1. Therefore, the global transition stored in the memories 532, 533 and 534 is deleted as redundant when the output of the AND gate 619 is ON. The global transition candidate which deleted a redundant one is stored in the memory 627.

The coupling block 7 tests if a global transition candidate from global state G including transmission transition, obtained in the redundant global transition candidate deletion block 6 satisfies the following conditions.

(a) If a reception relating to the transmission is specified in the original global state G, and the reception buffer is empty.

(b) The reception process has no specified transition at the state, or even if it has specified transition, that specified transition must be unexecutable reception.

(c) The reception process does not receive a signal at the process, except the process which sends that signal. Or, it can receive a signal, and the first signal must be specified.

When above three conditions are satisfied, the signal reception transition is coupled with the global transition, and a new global transition is obtained. The above process is called a coupling process, or a bulk process, and the result is sent to the global state transition chart update block 8.

For example, in FIGS. 2 and 6, by the process of the blocks 4 through 6, the global transition in the stable global state $(A_1, D_2, B_3)$ is only $[-6_2{}^3]$. The process 2 which receives that signal has no executable transition except for the reception transition $[+6_2{}^3]$, and therefore satisfies the above conditions (a) and (b). Further, the process 2 has no signal from the process 1 at the state $D_2$, and the first signal from the process 3 is specified to the signal 6, and therefore, it satisfies the above condition (c). Therefore, the global transition $[-6_2{}^3]$ from the global state $(A_1, D_2, B_3)$ becomes to $[\pm 6_2{}^3]$ which couples the reception transition $[+6_2{}^3]$ of the process 2.

FIG. 15 shows a detail of the coupling block 7. The blocks (a) and (b) of FIG. 15 relate to said conditions (a) and (b), respectively.

In FIG. 15, the global transition is stored in the memory 627, which is read out one by one. The numeral 700 is a decision circuit which tests if the global transition from the memory 627 includes a transmission. When no transmission is included, the gate 702 is opened, and the global transition is stored in the memory 704 through the gate 702 and the OR gate 703. When the global transition includes a transmission, the decision circuit 700 derives the transmission, and transfers the same to the memory 705, and the global transition is stored in the register 706. The transmission stored in the memory 705 is taken out to the register 707 one by one, and the test is performed if the related reception can be coupled with the global transition in the register 706. The global state G which is subject to process is stored in the register 601.

First, all the transitions defined by the global state G is read out of the associative memory 101, and is stored in the memory 708. Each transition in the memory 708 is read out, and the comparator 709 compares the same with the content of the register 707 (a transmission included in the global transition). Thus, the test if the reception related to the transmission in the register 707 is included in the memory 708 or not. When that reception is included, the output of the comparator 709 becomes ON. The information in the buffer state part of the register 601, and the transmission of the register 707 are transferred to the decision circuit 710, where the test if the signal reception buffer related to the transmission in the register 707 is empty or not. When it is empty, the output of the decision circuit 710 becomes ON. Thus, when the above condition (a) is satisfied, the inputs of the AND circuit 711 are ON, and the output of the AND circuit 711, or the input A of the AND circuit 12 becomes ON.

On the other hand, the specified transition from the memory 708 and the transmission of the register 707 are also transferred to the decision circuit 713. When the process for executing the transition from the memory 708 is the same as the message reception process by the transmission transition in the register 707, and the transition from the memory 708 is not the reception related to the transmission of the register 707, the output of said decision circuit 713 becomes ON. As a result, among the transitions in the memory 708, only the process for receiving the message by transmission transition of the register 707 is taken out, and passes the gate 714, and is stored in the memory 715. Each transition in the memory 715 is read out one by one, and is applied to the decision circuit 716, which tests if the transition is a transmission or a reception. When there is at least one transmission, a control pulse is sent to the flip-flop 718 through the OR gate 717 to reset the flip-flop 718. Of course, it is assumed that the flip-flop 718 is initially in set state. When it is a reception, it is transferred to the associative memory 101, and a test if the reception is unexecutable is carried out. The result is applied to the decision circuit 719, which provides a control output pulse when there is at least one reception which is not unexecutable. That control pulse is applied to the flip-flop to reset the same through the OR gate 717. As a result, when said condition (b) is satisfied, that is to say, when the reception process related to the transmission of the register 707 is a global state G, no specified transition except that reception exists or when specified transition exists all of them are unexecutable, the output of the flip-flop 718 becomes ON, the input B of the AND gate 712 becomes ON.

Said condition (c) is essentially the same as the condition (c) in the block 6, and is tested by the circuit similar to the circuit of the members 611 through 618 in FIG. 14. The result of the test becomes the input C of the AND gate 712.

As a result, the output of the AND gate 712 becomes ON when all the conditions (a), (b) and (c) are satisfied.

At that time, the transmission of the register 707 is converted to the related reception in the converter 720, and the converted result is transferred to the register 721. On the other hand, the global transition of the register 706 is also transferred to the register 721, therefore, the register 721 stores the global transition which couples the transmission and the reception. That global transition is sent to the memory 704 through the OR gate 703. When the output of the AND gate 712 is OFF, that is to say, when no coupling process is performed, the output of the inhibit circuit 722 is ON, the gate 702 opens, and the global transition in the memory 627 is directly transferred to the memory 704. Thus, the resultant global transition by the transmission/reception coupling process is stored in the memory 704.

Upon completion of the above operation, the block 7 triggers the block 8.

The global state transition chart update block 8 receives the information relating to the global transition determined by the transmission/reception coupling block 7, and updates the global state transition chart and the unprocessed global state set ( Λ ) in the memory 12, according to the result of the block 7. First, using the protocol specification in the memory 1, the new global state obtained by the execution of each global transition from the block 7 is determined. Next, the global state thus obtained, except those in the unprocessed global state set ( Λ ) in the memory 12, are added to the unprocessed global state set ( Λ ) in the memory 12. Further, the global transition thus obtained and the unprocessed global state are added to the global state transition chart in the memory 12, and triggers the block 9.

Figure 16:
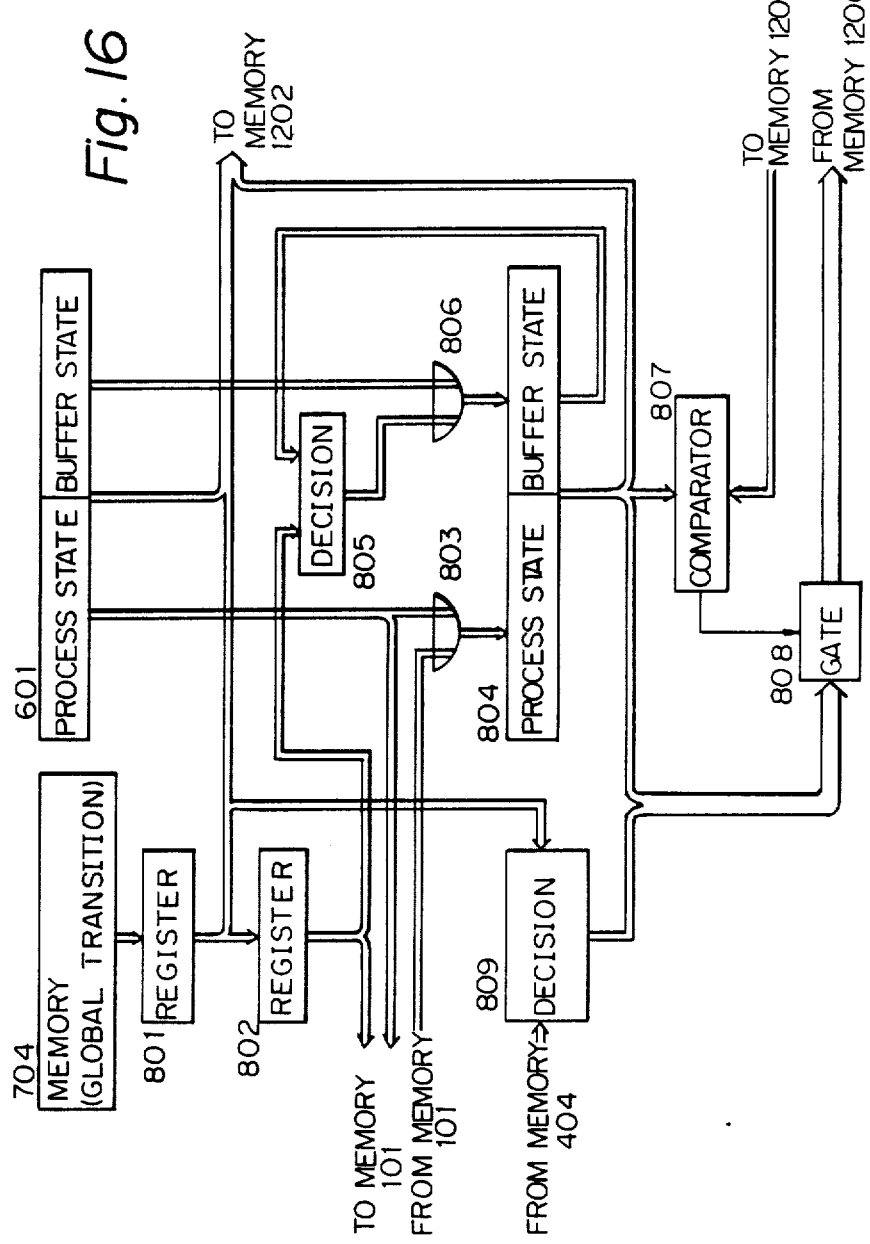
FIG. 16 is a detailed block diagram of the global state transition update block 8 in FIG. 1.

FIG. 16 is a detailed block diagram of the global state transition update block 8. All the global transitions of the global state G which is subject to process are stored in the memory 704, by the operation up to FIG. 15. The global transition stored in the memory 704 is read out to the register 801 one by one, and according to the read out signal, the global state transition chart stored in the memory 1202 and the unprocessed global state stored in the memory 1206 are updated.

The global transition in the register 801 has in general a plurality of process transitions, each of which is read out to the register 802 one by one.

The update of the global state is accomplished by applying a process transition in a global transition in the register 802, repetitively. The resultant updated global state is stored in the register 804, which has the content of the register 601, that is the original global state G.

The update operation of the process start part in the register 804 is first described. The process transition in the register 802 is transferred to the associative memory 101, together with the global state G to be processed in the register 601, and takes the new process state of the process, after the execution of the process transition. As a result, it is transferred to the process state part of the register 804 through the OR gate 803. As the register 804 has the content of the register 601 beforehand, only the process which executes the transition of the register 802 is updated.

Next, the update operation of the buffer state part of the register 804 is described. The process transition in the register 802 is also sent to the decision circuit 805, which, when a transition in the register 802 is a transmission, inserts a signal corresponding to the transmission of the register 802, at the last position of the signal stored in the signal reception buffer related to said transmission. When the transition in the register 802 is a reception, the first signal in the reception signal buffer is deleted. The above operation is repeated for all the process transitions in the register 801, and then, the updated global state which transits by executing the global transition in the register 801 is obtained in the register 804.

The old global state in the register 601, the global transition in the register 801, and the updated global state in the register 804 are transferred to the memory 1202 which stores the global state transition chart. Thus, the global state transition chart is updated.

On the other hand, the comparison decision circuit 807 compares the unprocessed global state in the memory 1206 with the updated global state in the register 804. When the updated global state in the register 804 is not stored in the memory 1206, the output of the gate 808 becomes ON.

The numeral 404 is, as described in FIG. 13, a memory which stores the immediately executable transitions at the global state G. The numeral 809 is a decision circuit which receives the global transition from the global state G in the register 801, and the immediately executable transition in the memory 404, and outputs all the immediately executable transitions in the process which is not included in the global transition in the register 801. The output of the decision circuit 809 becomes the excluded transition at the updated global state after the execution of the global transition in the register 801. As a result of the above operation, when the updated global state in the register 804 is not included in the unprocessed global state in the memory 1206, the gate 808 opens, and the updated global state in the register 804 and the excluded transition at the updated global state obtained from the decision circuit 809 are added to the memory 1206, which is thus updated.

The unprocessed global state pick up block 9 accesses the ( Λ ) in the memory 12, and searches an unprocessed global state among content of the memory 12. When no unprocessed global state exists, the unexecutable transmission/reception detection block 10 is triggered. When an unprocessed global state exists, it is stored in G in the memory 12, and the unspecified reception detection block 3 is triggered.

The unexecutable transmission/reception detection block 10 compares a transmission/reception transition included in the protocol in the memory 1 with a transmission/reception transition in the global state transition chart in the memory 12. An unexecutable transmission/reception is defined as a transmission/reception transition which is not included in the former but is included in the latter. That unexecutable transmission/reception is stored in the memory 12 (memory 1205).

The deadlock detection block 11 refers the protocol specification in the memory 1, and tests if there exists an immediately executable transition at the global state designated by G in the memory 12. If the result is no, the global state is determined as a dead lock state, and the result is stored in the memory 12 (memory 1204). Then, the unprocessed global state pick up block 9 is triggered.

All the errors of the specification can be detected according to the above operation. The feature of the present invention is the presence of the operation of the immediate executable transition pick up block 4 through the transmission/reception coupling block 7. The presence of those blocks does not disturb the detection of an error of a specification of a protocol. In the following description, the first processing is defined as the blocks 4 and 5, the second processing is defined as the block 6, and the third processing is defined as the block 7.

First, the execution of only the first processing, with no execution of the second processing and the third processing does not miss the detection of an error, that is to say, the production of a global state transition chart by executing all the global transition obtained by the first processing detects all the errors.

First processing separates clearly each executable process transition to the first case in which the actual execution is performed, and the second case in which no execution is performed. In the former case, all the executable transitions are executed immediately. Accordingly, it is clear that there is no executable specified transmission/reception which becomes unexecutable. On the other hand, in general, when a sequence of an execution of a process transition is changed to reach a predetermined global state, the final global state does not change on the condition that the changed series is executable and the sequence of series of each process does not change. In other words, the first processing can provide all the accessible global state. Accordingly, no executable unspecified reception and/or deadlock state which become undetectable exists.

Therefore, it is understood that the global state transition chart produced by the first processing (global state candidate decision processing) may detect all the errors.

Next, the combination of the first processing and the second processing does not provide an error for detecting a specification error. As the redundant global transition candidate deletion process does not change an executable specified transition to unexecutable one, the detection of an executable specified transition is never missed. In general, in a global state $$G = \left( (s_i) \; i = 1, (c_{ij})t, j = 1 \begin{array}{c} N \\ \end{array} \begin{array}{c} N \\ \end{array} \right)$$

when a global transition which does not include a process k is deleted, an executable unspecified reception at the process k might be missed. However, in that process, the global transition is deleted only for the process which satisfies said condition (b), in which first reception signal from another process is specified, therefore, an executable unspecified reception is never missed.

A part of (stable) global states is deleted in general by redundant global transition candidate deletion. However, the deleted global transition locates between a new global transition obtained by executing an original global transition from the original global state G, and the original global state G, and it is absolutely possible to transit to the former global state. Therefore, no dead lock occurs. Therefore, no mistake to miss a dead lock occurs.

Accordingly, the combination of the processing 1 and the processing 2 detects all the errors of the specification.

Next, the global state transition chart obtained by the combination of the first processing, the second processing, and the third processing detects all the errors of the specification. The third processing expedites the reception processing of an executable process, and does not disturb an execution of another executable transition. Therefore, the third processing does not cause the mistake of detection of an executable specified transition. Further, since all the executable receptions of the process which has a reception to be coupled are completely detected, according to said condition (c), an executable unspecified reception is never missed. Further, since the third processing merely expedites a reception, no stable global state is deleted by the third processing. Therefore, the detecting of a deadlock is not missed.

As apparent from the above explanation, the production of a global state transition chart by executing said processing 1, 2 and 3, provides the complete detection of errors in a protocol specification.

As described above, according to the present invention, each of the process transitions are coupled together, so long as no disadvantage for detection of a specification error happens. Therefore, a number of global states, and a number of global transitions are considerably reduced, as compared with those of a prior art. The following table 1 shows the comparison of the present invention and a prior art, where a protocol is the one shown in FIG. 2.

TABLE 1

|  | prior art | present invention (ratio) |
|---|---|---|
| Number of transitions | 25 (1) | 14 (0.64) |
| Number of states | 19 (1) | 13 (0.68) |

Accordingly, the amount of necessary process requested for the validity test is considerably reduced as compared with that of a prior art, and a hardware implementation becomes possible, together with the reduction of memory capacity which stores a global state transition chart, et al.

From the foregoing, it will now be apparent that a new and improved protocol validity system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A protocol validation system for a design procedure for software in a communication system, receiving a protocol specification in a form of electrical signals, and testing said protocol specification through a transition of global states according to transition information of said protocol specification, to find an error of said protocol specification, said system comprising:

(a) a memory for storing a set of said protocol specification which is subject to validation, (b) means for deriving the initial global state, which is composed of initial states of all the processes in said specification and signal series in signal reception buffers between said processes, based on said specification stored in said memory, (c) means for registering a global state as a member of a set of yet to be processed global states, (d) means for selecting one member from said set of yet to be processed global states, (e) means for obtaining global transition candidates, each of which is a combination of immediately executable transitions at said member global state of said set of yet to be processed global states, (f) means for determining nonredundant global transitions at said global state by deleting redundant global transitions from said global transition candidates according to a predetermined condition, (g) means for registering every process transition in said nonredundant global transitions as a member of a set of executable process transitions, (h) means for deriving global states, which are composed of the state of all the processes in said protocol specification and signal series in signal reception buffers between said processes, by the execution of said nonredundant global transitions, (i) means for detecting errors by investigating said global states in comparison with said protocol specification, (j) means for registering each of said global states, which has yet to be processed by means (d) through (h), as a member of said set of yet to be processed global states, (k) means for detecting errors by comparing the members of said set of executed process transitions with said protocol specification.

2. A protocol validation system for a design procedure for software in a communication system, receiving a protocol specification in a form of electrical signals, and testing said protocol specification through a transition of global states according to transition information of said protocol specifications, to find an error of said protocol specification, said system comprising:

(a) a memory for storing a set of said protocol specification which is subject to validation, (b) means for deriving the initial global state, which is composed of initial states of all the processes in said specification and signal series in signal reception buffers between said processes, based on said specification stored in said memory, (c) means for registering a global state as a member of a set of yet to be processed global states, (d) means for selecting one member from said set of yet to be processed global states, (e) means for obtaining global transition candidates, each of which is combination of immediately executable transitions at said member global state of said set of yet to be processed global states, (f) means for determining nonredundant global transitions at said global state by deleting redundant global transitions from said global transition candidates according to a predetermined condition, (g) means for registering every process transition in said nonredundant global transitions as a member of a set of executable process transitions, (h) means for deriving global states, which is composed of the state of all the processes in said protocol specification and signal series in signal reception buffers between said processes, by the execution of said nonredundant gobal transitions, (i) means for detecting errors of deadlocks by investigating whether there exists no immediately executable and specified process transition at said global state and for detecting errors of unspecified reception by investigating whether there exists any immediately executable but not specified reception at said global state, (j) means for registering each of said global states, which has yet to be processed by means (d) through (h), as a member of said set of yet to be processed global states, (k) means for detecting errors of redundant reception by investigating whether there exists any specified transition which is not equal to any member of said set of executed process transitions.

* * * * *